(12) United States Patent
Huber et al.

(10) Patent No.: US 11,265,700 B2
(45) Date of Patent: Mar. 1, 2022

(54) METHODS AND SYSTEMS FOR DETECTING AND RESPONDING TO PAGING CHANNEL ATTACKS

(71) Applicant: QUALCOMM Incorporated, San Diego, CA (US)

(72) Inventors: Mattias Kaulard Huber, Solana Beach, CA (US); Subrato Kumar De, San Diego, CA (US); Ankur Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/546,582

(22) Filed: Aug. 21, 2019

(65) Prior Publication Data
US 2020/0178065 A1  Jun. 4, 2020

Related U.S. Application Data

(60) Provisional application No. 62/774,072, filed on Nov. 30, 2018.

(51) Int. Cl.
*H04W 8/26* (2009.01)
*H04W 76/28* (2018.01)
(Continued)

(52) U.S. Cl.
CPC .............. *H04W 8/26* (2013.01); *H04W 24/08* (2013.01); *H04W 68/005* (2013.01);
(Continued)

(58) Field of Classification Search
CPC ....... H04W 8/26; H04W 76/28; H04W 76/11; H04W 76/27; H04W 24/08;
(Continued)

(56) References Cited

U.S. PATENT DOCUMENTS

2018/0206070 A1\* 7/2018 Harrow ................ H04W 68/04
2018/0270786 A1\* 9/2018 Nair ..................... H04W 12/12
(Continued)

FOREIGN PATENT DOCUMENTS

| EP | 3258719 A1 | 12/2017 |
|---|---|---|
| WO | 2018014937 A1 | 1/2018 |
| WO | 2018040565 A1 | 3/2018 |

OTHER PUBLICATIONS

3GPP TR 33.899 V1.3.0 (Aug. 2017). (Year: 2017).\*
(Continued)

*Primary Examiner* — Hassan A Phillips
*Assistant Examiner* — Mohammed S Chowdhury
(74) *Attorney, Agent, or Firm* — The Marbury Law Group, PLLC

(57) ABSTRACT

Methods for countering a shared paging channel hijack attack. In an example embodiment, a wireless device may monitor the shared paging channel during a paging occasion in a DRX cycle to detect a first IMSI-based paging message in the paging occasion, and continue monitoring for IMSI-based paging in subsequent radio subframes in the paging frame and radio subframes in subsequent radio frames within the DRX cycle to determine whether there are indications of a paging channel hijack attack. In an example embodiment, this monitoring may be to determine whether one or more subframes that are not the paging occasion receive IMSI-based paging messages, in response to which a threat probability may be increased. The wireless device may perform an operation (e.g., an actuation operation such as disabling monitoring of, and preventing connection attempts to, the base station, etc.) to protect against a shared paging channel hijack attack.

30 Claims, 11 Drawing Sheets

(51) Int. Cl.
  *H04W 76/11* (2018.01)
  *H04W 76/27* (2018.01)
  *H04W 24/08* (2009.01)
  *H04W 68/00* (2009.01)

(52) U.S. Cl.
  CPC ............ *H04W 76/11* (2018.02); *H04W 76/27* (2018.02); *H04W 76/28* (2018.02)

(58) Field of Classification Search
  CPC .............. H04W 68/005; H04W 68/02; H04W 12/1202; H04W 12/1204; H04W 12/122; H04L 63/1425; H04L 63/1466
  See application file for complete search history.

(56) References Cited

U.S. PATENT DOCUMENTS

| | | | |
|---|---|---|---|
| 2019/0045423 A1* | 2/2019 | Kumar | H04W 12/106 |
| 2019/0110205 A1* | 4/2019 | Shaik | H04W 48/16 |
| 2020/0162925 A1* | 5/2020 | Miao | H04W 12/122 |
| 2020/0169982 A1* | 5/2020 | Hoglund | H04W 52/0219 |

OTHER PUBLICATIONS

3GPP TS 36.304 V15.1.0 (Sep. 2018). (Year: 2018).*
International Search Report and Written Opinion—PCT/US2019/058727—ISA/EPO—dated Jan. 27, 2020.

* cited by examiner

METHODS AND SYSTEMS FOR DETECTING AND RESPONDING TO PAGING CHANNEL ATTACKS

RELATED APPLICATIONS

This application claims the benefit of priority to U.S. Provisional Application No. 62/774,072, entitled "Methods and Systems for Detecting and Responding to Paging Channel Attacks" filed Nov. 30, 2018, the entire contents of which are hereby incorporated by reference for all purposes.

BACKGROUND

Long Term Evolution (LTE), 5G new radio (NR), and other recently developed communication technologies allow wireless devices to communicate information at data rates (e.g., in terms of Gigabits per second, etc.) that are orders of magnitude greater than what was available just a few years ago. Today's communication networks are also more secure, resilient to multipath fading, allow for lower network traffic latencies, and provide better communication efficiencies (e.g., in terms of bits per second per unit of bandwidth used, etc.). These and other recent improvements in communication technologies have facilitated the emergence of the Internet of Things (IOT), large scale Machine to Machine (M2M) communication systems, autonomous vehicles, and other technologies that rely on consistent and secure wireless communications. As a result, billions of small, mobile, or resource constrained computing devices (e.g., smartphones, watches, smart appliances, autonomous vehicles, etc.) now use Internet protocol (IP) and cellular communication networks to communicate critical and mundane information.

Concurrent with the above trends, software defined radio (SDR) chips and universal software radio peripheral (USRP) boards have become less expensive and are now widely available. Open source LTE/3G stacks (srsLTE, openLTE, OpenBTS-UMTS, etc.) allow programmers to quickly install and operate a base station via a laptop computer. These technologies have dramatically reduced the costs associated with setting up and operating a base station in a shell telecommunication network.

Due to these trends, wireless devices and cellular communication networks are increasingly vulnerable to sophisticated cyber-attacks, such as paging channel hijacking attacks, launched by fake or malicious base stations that can spoof the base stations of network service providers. Such attacks may be used by nefarious actors to track users, map communication networks, launch denial of service attacks, drain the battery and processing resources of resource constrained computing devices (e.g., IOT devices, etc.), and otherwise disrupt or hinder the services provided by communication networks and service providers.

SUMMARY

The various aspects include methods of countering a shared paging channel hijack attack, which may include monitoring, by a processor of a wireless device, a shared paging channel during a paging occasion in a discontinuous reception (DRX) cycle to detect a first international mobile subscriber identity (IMSI) based paging message in the paging occasion, continuing monitoring, by the processor, for IMSI-based paging in subsequent radio subframes in a paging frame after receiving the first IMSI-based paging message, continuing monitoring, by the processor, for IMSI-based paging in one or more radio subframes in one or more subsequent radio frames within the DRX cycle, continuing monitoring, by the processor, for IMSI-based paging in one or more subsequent DRX cycles, determining, based on the monitoring, whether another subframe that is not the paging occasion receives an IMSI-based paging message, and adjusting a rogue probability for a base station in response to determining that another subframe that is not the paging occasion receives the IMSI-based paging message.

Some aspects may further include determining, based on the monitoring, whether there are repeated IMSI-based paging messages, in which adjusting the rogue probability for the base station in response to determining that another subframe that is not the paging occasion receives the IMSI-based paging message includes adjusting the rogue probability for the base station in response to determining that another subframe that is not the paging occasion receives the IMSI-based paging message or that there are repeated IMSI-based paging messages.

Some aspects may further include performing an operation to protect against the shared paging channel hijack attack in response to determining that another subframe that is not the paging occasion receives the IMSI-based paging message or that there are repeated IMSI-based paging messages. Some aspects may further include determining whether the wireless device during monitoring increments an attach request counter each time it detects the IMSI-based paging message in a subframe that is not the paging occasion, and performing the operation to protect against the shared paging channel hijack attack in response to determining that another subframe that is not the paging occasion receives the IMSI-based paging message may include performing the operation to protect against the shared paging channel hijack attack in response to detecting that another subframe that is not the paging occasion receives the IMSI-based paging message and/or in response to determining that the wireless device does increment an attach request counter each time it detects the subframe that is not the paging occasion that received the IMSI-based paging message. In some aspects, performing the operation to protect against the shared paging channel hijack attack in response to detecting that another subframe that is not the paging occasion receives the IMSI-based paging message may include performing one of ignoring future paging messages from a base station that transmitted the first IMSI-based paging message, detaching from the base station that transmitted the first IMSI-based paging message, or generating and sending a notification message to a security server.

In some aspects, adjusting the rogue probability for the base station may include adjusting a probability value that indicates a likelihood that a base station that transmitted the first IMSI-based paging message is not a legitimate base station authorized by a service provider network associated with the wireless device, and such aspects may further include determining whether the rogue probability exceeds a threshold, and performing an operation to protect against the rogue base station in response to determining that the rogue probability exceeds the threshold. Some aspects may further include performing monitoring, by the processor, of subsequent radio subframes for additional indications of a rogue base station in response to determining that another subframe receives the IMSI-based paging message or that there are repeated IMSI-based paging messages, and adjusting the rogue probability in response to detecting the additional indications of the rogue base station.

Some aspects may further include performing monitoring of subsequent radio subframes for additional indications of a rogue base station by comparing radio resource control (RRC) connection setup parameters from a previous RRC connection setup to determine whether signaling radio bearers (SRB) channels setup are different for two base stations with the same cell ID parameter, same SIB1 information and same SIB2 information, and adjusting a threat score (or rogue probability) for a base station that transmitted the first IMSI-based paging message from among a plurality of base stations that broadcasted themselves with the same Cell ID, and substantially similar SIB1s, and substantially similar SIB2s. Some aspects may further include detecting a current IMSI leak attack, recording an event in memory that indicates that the wireless device was subject to the current IMSI leak attack, recording information identifying the base station that triggered the current IMSI leak attack, recording a location and time associated with the current IMSI leak attack, comparing the information recorded for previous IMSI leak attacks with the current IMSI leak attack, and adjusting the rogue probability based on the recorded information.

Some aspects may further include storing a record of signal strength values of one or more previous base stations that the wireless device camped and successfully connected to with security context set up, determining a first signal strength value for a base station that transmitted the first IMSI-based paging message, identifying one or more previous base stations in the one or more previous base stations that the wireless device camped and successfully connected to with security context set up that have similar characteristics to the base station that transmitted the first IMSI-based paging message, determining whether a difference between the first signal strength value and a recorded signal strength value associated with at least one the identified previous base stations having matching characteristics exceed a threshold value, and increasing the rogue probability in response to determining that the difference between the first signal strength value and the recorded signal strength value associated with the at least one the identified previous base stations having matching characteristics exceeds the threshold value.

Some aspects may further include determining whether 'channel config' and 'power config' parameters/timers are different in two channels, and increasing the rogue probability in response to determining that the channel config and power config parameters/timers are different. Some aspects may further include disabling monitoring of and preventing connection attempts to a base station that transmitted the first IMSI-based paging message for a period of time in response to determining another subframe that is not the paging occasion receives the IMSI-based paging message or in response to determining that the rogue probability for the base station exceeds the threat threshold due to receiving repeated IMSI paging from the base station, continuing to monitor other base stations for IMSI-based paging messages, incrementing a monitoring disabled value that indicates a number of times that monitoring has been disabled for the base station, exponentially incrementing the period of time for which the monitoring remains disabled for the base station by the wireless device in response to determining that the monitoring disabled value of the base station exceeds a threshold value, and preventing any connection to the base station while the monitoring for IMSI-based paging is disabled due to the monitoring disabled value exceeding the threshold value for the base station.

Some aspects may include determining whether the current network operator is commonly using IMSI-based paging by keeping track of usage of IMSI-based paging on paging occasions for various base stations by the same operator that the wireless device was connected to earlier, determining whether there are IMSI-based paging messages outside of the paging occasion in the monitored subsequent DRX cycles, suspending monitoring in response to determining that there are no IMSI-based paging messages that are outside of the paging occasion in the monitored subsequent DRX cycles for a base station operated by an operator determined to be commonly using IMSI paging, and reducing the rate in which the probability of threat is increased on each detection of IMSI paging in the paging occasion whenever monitoring is enabled until finally monitoring is suspended.

Further aspects may include a wireless device having a wireless transceiver and a processor coupled to the wireless transceiver and configured with processor-executable instructions to perform operations corresponding to any of the methods summarized above.

Further aspects may include a wireless device having means for performing functions corresponding to any of the methods summarized above.

Further aspects may include a non-transitory processor-readable storage medium having stored thereon processor-executable instructions configured to cause a processor of a wireless device to perform operations corresponding to any of the methods summarized above.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
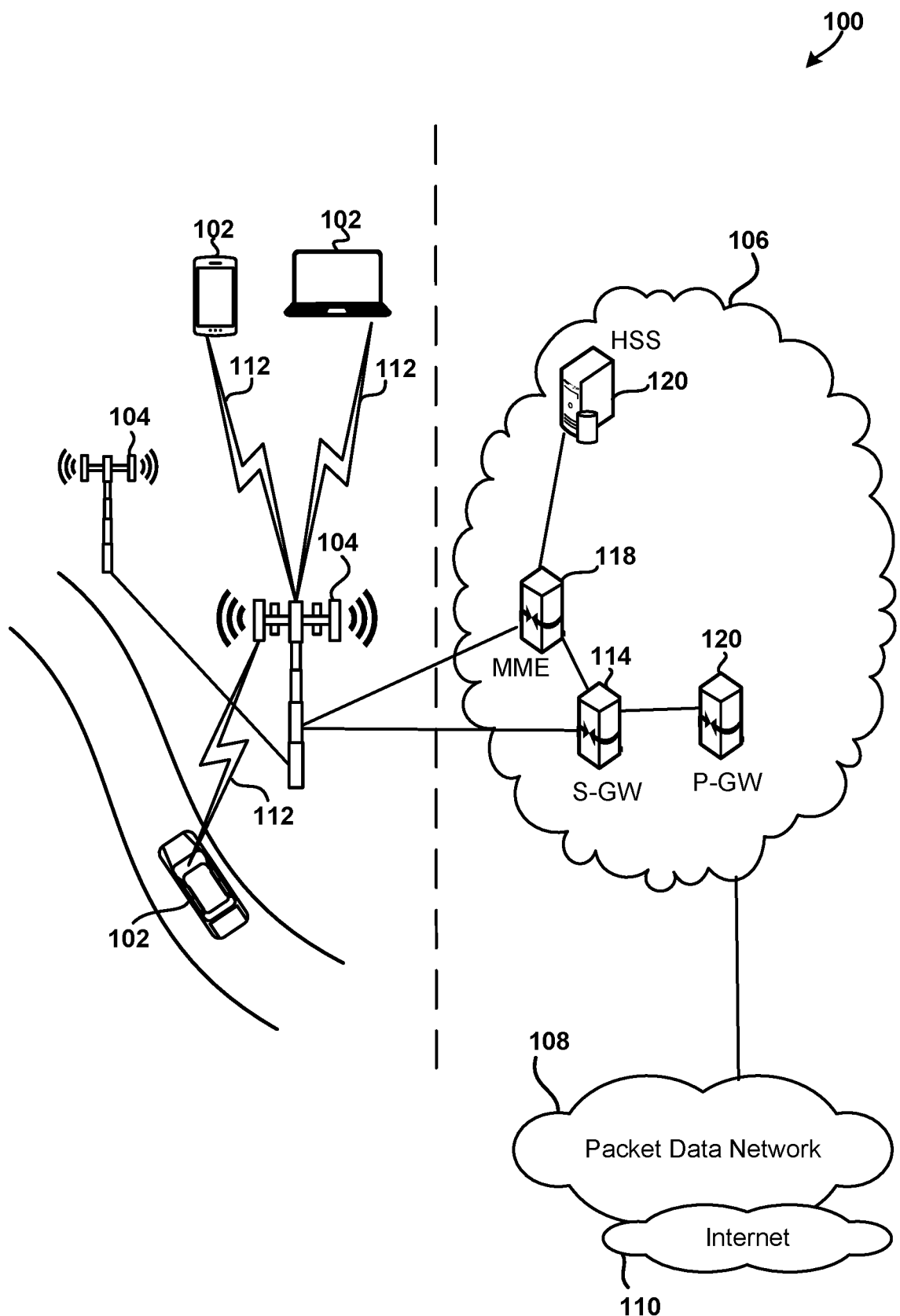
FIG. 1 is a communication system block diagram illustrating network components of an example telecommunication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Generally, paging is a procedure that wakes a wireless device up to receive a service like incoming calls, SMS, change in system information, emergency notifications, earthquake and tsunami warnings, etc. Some paging procedures are initiated by a mobility management entity (MME), some are initiated by a base station or eNodeB. Wireless devices in radio resource control (RRC) idle mode may use discontinuous reception (DRX), also known as paging cycle, to reduce power consumption. DRX cycle determines how frequently a wireless device will check for paging messages. The default DRX cycle is broadcast within system information block 2 (SIB 2) with the possible values as 32, 64, 128 and up to 256 radio frames. The wireless device can also suggest its own DRX cycle during the Attach Request and Tracking Area Update Request message. If a wireless device proposes its own DRX cycle to be used, the smaller of the two DRX cycles (e.g., eNodeB proposed DRX cycle and wireless device proposed DRX cycle) is used. Paging cycle may be measured in radio frames, with 128 radio frames being the commonly used value. One radio frame=10 msec; therefore 128 radio frames=1280 msec=1.28 seconds. Thus, a paging cycle of 128 means the wireless device will wake up after every 1.28 seconds even in idle mode to see if there is paging information is present for the wireless device. If it does not find paging information related to itself, it will go back to sleep. The radio frame in which wireless device wakes up is called the Paging Frame. A radio frame is further composed of 10 subframes. A wireless device does not remain awake in all 10 subframes of the paging radio frame but wakes up in one or more specific subframes within a paging radio frame. These specific subframes within a paging frame when the wireless device wakes up are called as paging occasions (PO).

Normally, wireless devices operate in idle mode (e.g., ECM-Idle, RRC-idle, etc.). When the wireless device receives a paging frame that is addressed to it during a paging occasion (a periodic time that the device wakes to listen to a paging channel), the wireless device wakes up and attaches to the tower to receive services. If the paging message addresses the wireless device via an international mobile subscriber identity (IMSI) value (as opposed to a temporary mobile subscriber identity (TMSI) value), the wireless device typically abandons its security authenticated context and sends an attach request to the base tower.

A nefarious actor or a rogue base station may utilize the paging features of existing communication networks to disrupt or hinder wireless devices from receiving the services provided by the communication network and/or service provider. For example, a nefarious actor or rogue base station executing a paging channel hijacking or similar attack may operate in the same frequency band as the legitimate base station, and broadcast fake or empty paging messages with higher apparent signal strength than the legitimate base station in the shared paging channel (PDSCH). The rogue base station may also match the discontinuous reception (DRX) and/or paging cycles of a wireless device, insert an IMSI value in each radio frame within the DRX cycle, and thereby cause the wireless device to receive and accept fake paging messages. These operations may cause the wireless device to repeatedly initiate a random access procedure in an attempt to attach to the rogue base station. If the wireless device successfully attaches to the rough base station, the base station may ascertain the location of the wireless device and/or track the movements of the wireless device user.

If the rogue base station includes a network IMSI value in each paging cycle, the wireless device will exit the idle state and repeat the random access procedure, including resource expensive cryptographic operations, many times. Forcing the wireless device to repeat such operations may drain the battery and dominate the processing resources of wireless device. In addition, causing the wireless device to respond to many fake paging messages could amount to a denial of service attack because the wireless device would be prevented from receiving paging messages from legitimate base stations. For remotely placed or hard to access IOT devices for which there is no manual access after initial installation, such denial of service attacks may render the device inoperable or unreachable for long periods of time. Such attacks may be particularly determinantal to IoT devices that, per NB-IoT, LTE-M standards, require 10-yrs battery life from a single battery without charging as such attacks may quickly drain the battery.

In addition, by hijacking the shared paging channel, the rogue base station may inject fake emergency paging messages and send them to a large number of wireless devices. This may compromise the safety of wireless device users, create artificial emergency situations, or create public disorder.

Various embodiments include methods, and devices configured to implement the methods, for detecting channel hijacking attacks and preventing hijacking of a shared paging channel (e.g., PDSCH, etc.) by monitoring the shared paging channel during a paging occasion in a discontinuous reception (DRX) cycle to detect a first IMSI-based paging message in a subframe, and continuing monitoring of subsequent radio subframes within the paging frame in the DRX cycle after the first paging message (i.e., after the first IMSI-based paging message), and also all the subframes for a few subsequent radio frames within the current and few subsequent DRX cycles to determine whether one or more subframes receives IMSI-based paging messages. The amount of consecutive radio frames after the paging frame, and the amount of consecutive DRX cycles, to observe for the presence of IMSI-based paging can be configurable and is left to a particular implementation. The presence of a paging message that includes an IMSI value in another subframe outside of the paging occasion is a strong indication that the message is being transmitted from a rogue base station attempting a channel hijacking attack. The presence of a large number of subframes (e.g., greater than 4) that observes IMSI-based paging within the same or few consecutive DRX cycle is also a strong indication that the paging messages are being transmitted from a rogue base station. In response to detecting such conditions, the wireless device may perform various actuation operations to avoid falling victim to a channel hijacking attack, such as ignoring future messages from the base station that transmitted the first paging message, detaching from the base station, and/or generating and sending a notification message to a security server in the service provider network. In this paragraph wherever it is indicated "IMSI-based paging," the IMSI implies the IMSI value for the particular wireless device (or UE) that is receiving the paging message.

The wireless device may also be configured to monitor, detect, and respond to other conditions, such as inconsistencies or differences in radio resource control (RRC) channel setup parameters, the existence of previous IMSI leak attacks on the wireless device, repeated IMSI paging without updating an attach request counter value, significant differences in signal strengths between the transmitting base station and another seemingly similar base station, and a large amount of interference prior to receiving the IMSI paging are also indicative of a malicious or rogue base station. The wireless device may be configured to update the value of a malicious indication value or probability score (e.g., between 0 and 1) associated with a base station that transmitted a paging message to indicate a probability that the base station is a rogue base station (i.e., not a legitimate base station that is authorized by the service provider network). Merely for ease of description, this probability is referred to herein as a "rogue probability." More particularly, the "rogue probability" is a probability value that indicates a likelihood that the base station is not a legitimate base station authorized by a service provider network associated with the wireless device.

When the rogue probability exceeds a threshold, the wireless device may determine that the message is being transmitted from a rogue base station. The threshold could be set based on various factors and/or encompass various ranges of values. As an example, the thresholds may vary based on the Mobile Network Code (MNC), and/or the Mobile Country Code (MCC) of the Base station the UE is attempting to connect, or already connected to. Multiple thresholds could also be used to capture multiple ranges for different categories, such as 'benign', 'possibly malicious', 'threatening', and/or 'hostile.' In some embodiments, the threshold may include a score, and the implementer (e.g., wireless device, etc.) may decide whether to use a single or multiple thresholds and ranges.

In response to determining that the rogue probability exceeds the threshold value and thus the base station is likely rogue, the wireless device may perform various actuation operations to avoid falling victim to the attack. For example, the wireless device may ignore future messages from a base station that transmitted the first paging message (the first IMSI-based paging message), detach from the base station, and/or send a notification message to a security server of the service provider network.

By continuing to monitor for IMSI-based paging (the "IMSI" implying the IMSI value for the particular wireless device that is receiving the paging message) in subsequent radio subframes in the paging frame after receiving the first IMSI-based paging message and in one or more radio subframes in one or more subsequent radio frames within the DRX cycle, to determine whether another subframe that is not the paging occasion receives an IMSI-based paging message, the wireless device may intelligently determine and evaluate the probability (or threat score, etc.) that a channel hijacking attack is being attempted. As such, various embodiments may improve overall performance and functioning of wireless devices by providing new and improved solutions for protecting wireless communication networks and resource constrained computing devices, such as mobile, M2M and IOT devices, from channel hijacking and other cyber-attacks.

In addition, some network operators use IMSI-based paging in cases where they should be using TMSI based paging, thereby not following the 3GPP recommendations accurately. To avoid the detection mechanism in this application in unnecessarily getting triggered for these IMSI paging for these operators, specific mechanisms are provided in various embodiments to keep track of usage of IMSI-based paging on paging occasions for various base stations by a particular operator that the UE was connected to in the past. The UE may determine if a large number of base stations it was connected to for a particular operator have used IMSI-based paging in the paging occasion. For the current base station that the UE is connected to, the mechanism may determine whether there are IMSI-based paging messages outside of the paging occasion in the monitored subsequent DRX cycles. In response to the UE determining that the current base station is operated by a network operator for which there is a record of many other base stations that commonly used IMSI-based paging, the UE may suspend monitoring in response to determining that there are no IMSI-based paging messages that are outside of the paging occasion in the monitored subsequent DRX cycles for a base station operated by a particular operator, and also reduce the rate in which the probability of threat is increased on each detection of IMSI paging in the paging occasion whenever monitoring is enabled until finally monitoring is suspended.

The word "exemplary" is used herein to mean "serving as an example, instance, or illustration." Any implementation described herein as "exemplary" is not necessarily to be construed as preferred or advantageous over other implementations.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), and digital enhanced cordless telecommunications (DECT). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The term "IOT device" is used herein to refer to a wireless device that may use radio frequency (RF) communications to communicate with another device, for example, as a participant in a communication network, such as the IoT. Such communications may include communications with another wireless device, a base station (including a cellular communication network base station and an IoT base station), an access point (including an IoT access point), or other wireless devices.

The terms "user equipment" and "wireless device" may be used interchangeably herein to refer to any one or all of IOT devices, cellular telephones, smartphones, personal or mobile multi-media players, personal data assistants (PDA's), laptop computers, tablet computers, ultrabooks, palm-top computers, wireless electronic mail receivers, multimedia Internet enabled cellular telephones, wireless gaming controllers, smart cars, autonomous vehicles, and similar electronic devices which include a programmable processor, a memory and circuitry for sending and/or receiving wireless communication signals. While various embodiments are particularly useful in wireless devices, such as smartphones and tablets, the embodiments are generally useful in any electronic device that includes communication circuitry for accessing wireless IP and data services through cellular and wireless communication networks.

Some wireless devices include a subscriber identification module (SIM) hardware, memory, or card that stores information required by one or more radio systems (e.g., in a cellular communication network base station, etc.) to identify, authenticate, and/or locate the wireless device. The SIM may store one or more authentication keys, an IMSI value, a TMSI value, a location area code (LAC), a home public land mobile network (HPLMN) value, and other similar identification, authentication, or location information.

An IMSI value may be a sixty-four (64) bit field or a fifteen (15) digit number that serves as an identifier for the wireless device and network. The first three digits of an IMSI value may store a Mobile Country Code (MCC) value, the next three digits may store a Mobile Network Code (MNC) value, and the remaining nine (9) digits may store a Mobile Subscription Identification Number (MSIN). The combination of the MCC and MNC values may uniquely identify a specific cellular service provider (e.g., AT&T, Verizon, etc.) network and in a specific country. The MSIN value may uniquely identify the wireless device and/or the wireless device user.

The IMSI value includes sensitive identification information that may be used by nefarious actors to track the wireless device (and thus its user) or launch cyber-attacks. For security reasons, in LTE and other advanced communication networks, wireless devices typically only transmit their IMSI value during the initial random-access procedure in which they establish a connection to the network (e.g., after the device is powered on, moved to a new network location, etc.). The wireless devices may be configured to initiate the initial random-access procedure in response to receiving an IMSI-based paging message from the communication network.

A TMSI value is a randomly assigned temporary identifier that may be used to uniquely identify and address a wireless device. The TMSI value may be assigned to a wireless device by mobile switching center or visitor location register shortly after the initial random-access procedure. The TMSI value may be specific to the wireless device's current cell or tracking area, and updated each time the wireless device is moved to a new tracking area. For security purposes, the TMSI is the identity value that is most commonly communicated between the wireless device and the base stations.

A telecommunication network typically includes a plurality of base stations (e.g., eNodeBs in LTE), which may act as a bridge (e.g., layer 2 bridge) between the wireless devices and the network by serving as the termination point of all radio protocols towards the wireless devices, and relaying voice (e.g., VoIP, etc.), data, and control signals to network components within the network. Each base station generally covers a small geographical area. Groups of bases stations make up a location area, routing area, or tracking area (TA).

When a modem of a wireless device is powered on or the wireless device moves into a new geographical area, the modem scans the available networks to identify base stations in available networks through which the wireless device may connect to the global telecommunications network and ultimately to the Internet. This may be achieved by the wireless device receiving IMSI-based paging messages from surrounding base stations, and determining whether any of the received IMSI values (or the MCC/MNC values within the IMSI values) match the information stored on the wireless device's SIM. If the values match, the wireless device may establish a connection to a base station and camp thereon. When the values stored on the SIM do not match any of the values received from the available networks, the wireless device modem may perform roaming operations that include traversing a preferred roaming list to identify a visitor network through which the wireless device may connect to the global telecommunication network. If no suitable network is found, the wireless device does not establish a connection to the base station.

To support mobility between different tracking areas (TAs) within the same network, a wireless device may implement a location update procedure in which the wireless device periodically activates receiver circuitry to detect location area codes (LAC) broadcast by the base stations, and determines whether the detected LAC is different from the LAC stored on the SIM. The wireless device's modem may transmit a location update request and a TMSI value in response to determining that the detected LAC differs from the LAC value stored on the SIM.

To conserve battery and processing resources, after the initial random-access procedure, a wireless device may operate in an idle mode (e.g., ECM-Idle, RRC-Idle, etc.). While in idle mode, the wireless device does not actively monitor the network for communications. Rather, the wireless device may activate its receiver circuitry at select time periods to listen to a paging channel and determine whether it received a paging message that includes a TMSI or IMSI value that matches the information stored on the wireless device's SIM, etc. The wireless device may exit the idle mode and/or attach to a base station to receive call, message, or service in response to determining that it received a paging message that includes the IMSI value that matches the IMSI information stored on the wireless device's SIM.

A paging occasion is a time period during which a wireless device listens to a paging channel. The paging occasion may be determined by the network when the wireless device attaches to the base station and the system broadcast information is read.

A paging channel is a shared channel that is used by multiple wireless devices. The shared paging channel may be used to cause wireless devices to wake up and initiate a procedure, such as the random-access procedure in which the wireless device establishes a connection to a base station. Since the paging channel is shared, wireless devices that are attached or camped onto a base station may read the page messages addressed to other wireless devices in the same tracking area.

As described above nefarious actor or device may use the paging features of modem communication networks to launch a channel hijacking attack. For example, a nefarious actor or device may mimic a legitimate base station by using the same frequency and paging occasion as a legitimate base station. The nefarious actor or device may control the behavior of the wireless device by injecting into the paging channel of the legitimate base station messages that cause the wireless device to perform a procedure (e.g., random-access procedure, message retrieval procedure, etc.). The nefarious actor or device may hijack the paging channel used by the wireless device so that it can no longer receive paging messages from the legitimate base station. This is effectively a denial of service (DOS) attack as it may prevent the wireless device from receiving legitimate calls, messages, or services from the communication network. Further, since the wireless device may continue to receive paging messages during the paging occasion from the nefarious actor or device, the wireless device will not be aware that it has essentially been cut off from the network and/or is experiencing a denial of service attack.

Various embodiments include devices and components configured to identify, respond to, and prevent paging channel hijacking attacks from fake or malicious base stations that exploit that the paging features of modem communication networks.

In some embodiments, a processor in a wireless device (e.g., smartphone, IOT device, M2M device, etc.) may be configured to monitor the shared paging channel (e.g., PDSCH, etc.) during a paging occasion in a discontinuous reception (DRX) cycle to detect a first IMSI-based paging message in a radio subframe. In response to detecting the first IMSI-based paging message, the wireless device may continue monitoring subsequent radio subframes within the first paging frame and also all the subframes in the subsequent radio frames within the DRX cycle to detect another subframe that includes one or more IMSI-based paging. This monitoring could continue for multiple subsequent DRX cycles. The number of subsequent frames after the Paging frame for which to continue monitoring, and the number of subsequent DRX cycles to continue the monitoring is configurable and can be implementation dependent. Continued monitoring of subsequent radio subframes allows the wireless device to determine whether the base station is doing IMSI-based paging into many subframes to override the device's security measures, spoof a legitimate base station, or guess the wireless device's paging occasion. It should be noted that, in this paragraph, the IMSI in the phrase "IMSI-based paging" refers to the IMSI value for the particular wireless device (or UE) that is receiving the paging message.

In some embodiments, the wireless device processor may be further configured to perform an actuation operation in response to detecting that another subframe has IMSI-based paging during the continued monitoring of subsequent radio subframes. For example, if the wireless device detects another subframe that includes an IMSI-based paging in a radio frame that is outside the device's paging occasion, the wireless device may classify the base station as malicious, detach from that base station (if attached), ignore future messages from that base station, and/or send a notification message to a security server notifying it of the presence or existence of a rogue device.

Generally, each radio frame includes ten (10) subframes, and per the current LTE standards, up to four (4) of these subframes may be used for paging. In some embodiments, the wireless device may be configured to classify the base station as malicious or rogue in response to detecting more than four subframes that include an IMSI-based paging or find IMSI-based paging in subframes that are not supposed to be the paging occasions within the same paging frame (or more than the maximum allowed). If the wireless device detects frequent subframes that include an IMSI-based paging within the same paging frame and the positions of the subframes don't match the expected subframes for paging occasion, but not exceeding the maximum allowed, the wireless device may increase a rogue probability associated with a base station. The rogue probability may be a probability that indicates likelihood that the base station is not a legitimate base station that authorized by the service provider network associated with the wireless device. It should be noted that, in this paragraph, the IMSI in the phrase "IMSI-based paging" refers to the IMSI value for the particular wireless device (or UE) that is receiving the paging message.

In some embodiments, the wireless device processor may be configured to compare radio resource control (RRC) connection setup parameters from a previous RRC connection setup to determine whether the signal radio bearers being setup are different for two base stations that broadcasts itself with the same cell ID parameter, and with same SIB1 information and same SIB2 information. If the signaling radio bearers (SRBs) set up for the base stations that broadcasts themselves with the same cell ID parameter, and with same or closely similar SIB1 information and same or closely similar SIB2 information, the wireless device may increase the rogue probability associated with the base station that transmitted the IMSI-based paging message (or radio frame having a subframe includes the IMSI value).

FIG. 1 illustrates an example Evolved Packet System (EPS), Long Term Evolution (LTE) or evolved universal terrestrial radio access network (E-UTRAN) communication network 100 in which the various embodiments may be implemented. In the example illustrated in FIG. 1, the network 100 includes wireless devices 102, base stations 104, and various network components 106 for communicating with a packet data network (PDN) 108 and ultimately the Internet 110. The PDN 108 may include an operator IP services network, an Intranet, an IP multimedia subsystem (IMS), a PS streaming service (PSS) network, etc.

The wireless devices 102 may be configured to transmit and receive voice, data, and control signals to and from the base stations 104 via wireless communication links 112. The base stations 104 may include an evolved Node B (eNodeB), a remote radio head (RRH), a femto cell, pico cell, micro cell, a base transceiver station (BTS), a radio base station, a radio transceiver, a transceiver function, a basic service set (BSS), an extended service set (ESS), etc.

The base stations 104 may be configured to provide user plane (e.g., PDCP, RLC, MAC, PHY) and control plane (RRC) protocol terminations towards the wireless devices 102. The base stations 104 may act as a bridge (e.g., layer 2 bridge) between the wireless devices 102 and the network components 106 by serving as the termination point of all radio protocols towards the wireless devices 102, and relaying voice (e.g., VoIP, etc.), data, and control signals to the network components 106 in the core network. The base stations 104 may also be configured to perform various radio resource management operations, such as controlling the usage of radio interfaces, allocating resources based on requests, prioritizing and scheduling traffic according to various quality of service (QoS) requirements, and monitoring the usage of network resources. In addition, the base stations 104 may be configured to collect radio signal level measurements, analyze the collected radio signal level measurements, and handover wireless devices 102 (or connections to the wireless devices) to other base stations 104 (e.g., a second eNodeB) based on the results of the analysis.

The network components 106 may include various logical and/or functional components that serve as the primary point of entry and exit of wireless device traffic and/or connect the wireless devices 102 to their immediate service provider, the PDN 108 and ultimately the Internet 110. The network components 106 may be configured to forward the voice, data, and control signals to other components in the core network as user data packets, provide connectivity to external packet data networks, manage and store contexts (e.g. network internal routing information, etc.), and act as an anchor between different technologies (e.g., 3GPP and non-3GPP systems). The network components 106 may also coordinate the transmission and reception of data to and from the Internet 110, as well as the transmission and reception of voice, data and control information to and from an external service network, the PDN 108, other base stations 104, and to other wireless devices 102.

In the example illustrated in FIG. 1, data transmitted from the wireless devices 102 is received by a base station 104 (eNodeB). The base station 104 may send signaling/control information (e.g., information pertaining to call setup, security, authentication, etc.) to a mobility management entity (MME) 118. The MME 118 may request user/subscription information from a home subscriber server (HSS) 120, perform various administrative tasks (e.g., user authentication, enforcement of roaming restrictions, etc.), and send authorization and administrative information to the signaling gateway (SGW) 114 and/or the base station 104. The base station 104 may receive authorization information from the MME 118 (e.g., an authentication complete indication, an identifier of a selected SGW, etc.), and send data received from the wireless device 102 to the SGW 114. The SGW 114 may store information about the received data (e.g., parameters of the IP bearer service, etc.) and forward user data packets to a packet data network gateway (PGW) 120, which facilitates communications with the PDN 108 and ultimately the Internet 110.

The base stations 104 may be configured to manage the scheduling and transmission of paging messages originated from the MME 118, the scheduling and transmission of broadcast information originated from the MME 118, and the scheduling and transmission of public warning system (e.g., earthquake and tsunami warning system, commercial mobile alert service, etc.) messages originated from the MME 118.

The base stations 104 may be connected to the other base stations 104 via an X2 interface/protocol. The base stations 104 may be configured to communicate with the SGW 114 and/or MME 118 via the S1 interface/protocol.

The MME 118 may be configured to perform various operations to provide various functions, including non-access stratum (NAS) signaling, NAS signaling security, access stratum (AS) security control, inter-CN node signaling for mobility between 3GPP access networks, idle mode UE reach-ability (including control and execution of paging retransmission), tracking area list management (e.g., for a wireless device in idle and active mode), PGW and SGW selection, MME selection for handovers with MME change, Serving GPRS Service Node (SGSN) selection for handovers to 2G or 3G 3GPP access networks, roaming, authentication, bearer management functions including dedicated bearer establishment, support for public warning system (e.g., earthquake and tsunami warning system, commercial mobile alert service, etc.) message transmission, and performing paging optimization.

Figure 2A:
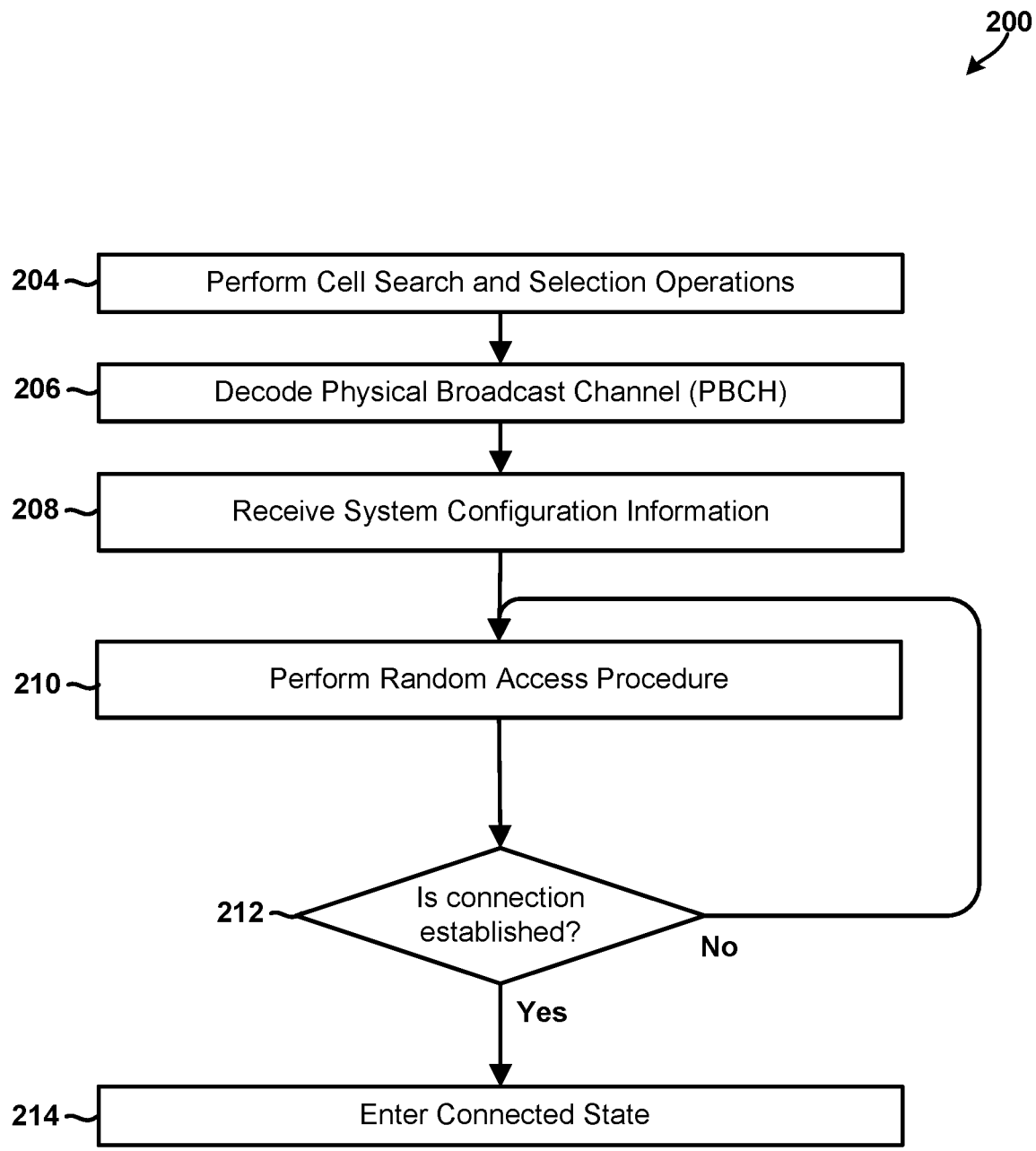
FIG. 2A is a process flow diagram illustrating a method of establishing a connection to a network and determining a discontinuous reception (DRX) cycle and/or a paging cycle for a wireless device.

FIG. 2A illustrates a method 200 of establishing a connection between a wireless device and a communication network (e.g., network 100 illustrated in FIG. 1). Method 200 may be performed via a processor in a wireless device (e.g., wireless device 102 illustrated in FIG. 1) shortly after the device is powered on so that it may access the communication network. Method 200 may also be performed in response to the wireless device determining that it is not currently attached to or camped on a base station, and network connectivity is required on the wireless device.

In operation block 204, the wireless device (e.g., wireless device 102 illustrated in FIG. 1) may perform cell search and selection operations, which may include detecting and decoding a primary synchronization signal (PSS) and a secondary synchronization signal (SSS) from a base station (e.g., base station 104 illustrated in FIG. 1).

In operation block 206, the wireless device may receive and decode a physical broadcast channel (PBCH) to receive basic system configuration information in a master information block (MIB). The basic system configuration information may include system bandwidth information, the number of transmit antennas used by the base station, physical hybrid-ARQ indicator channel (PHICH) configuration information, a PHICH Ng value, a system frame number (SFN), and other similar information.

Figure 2B:
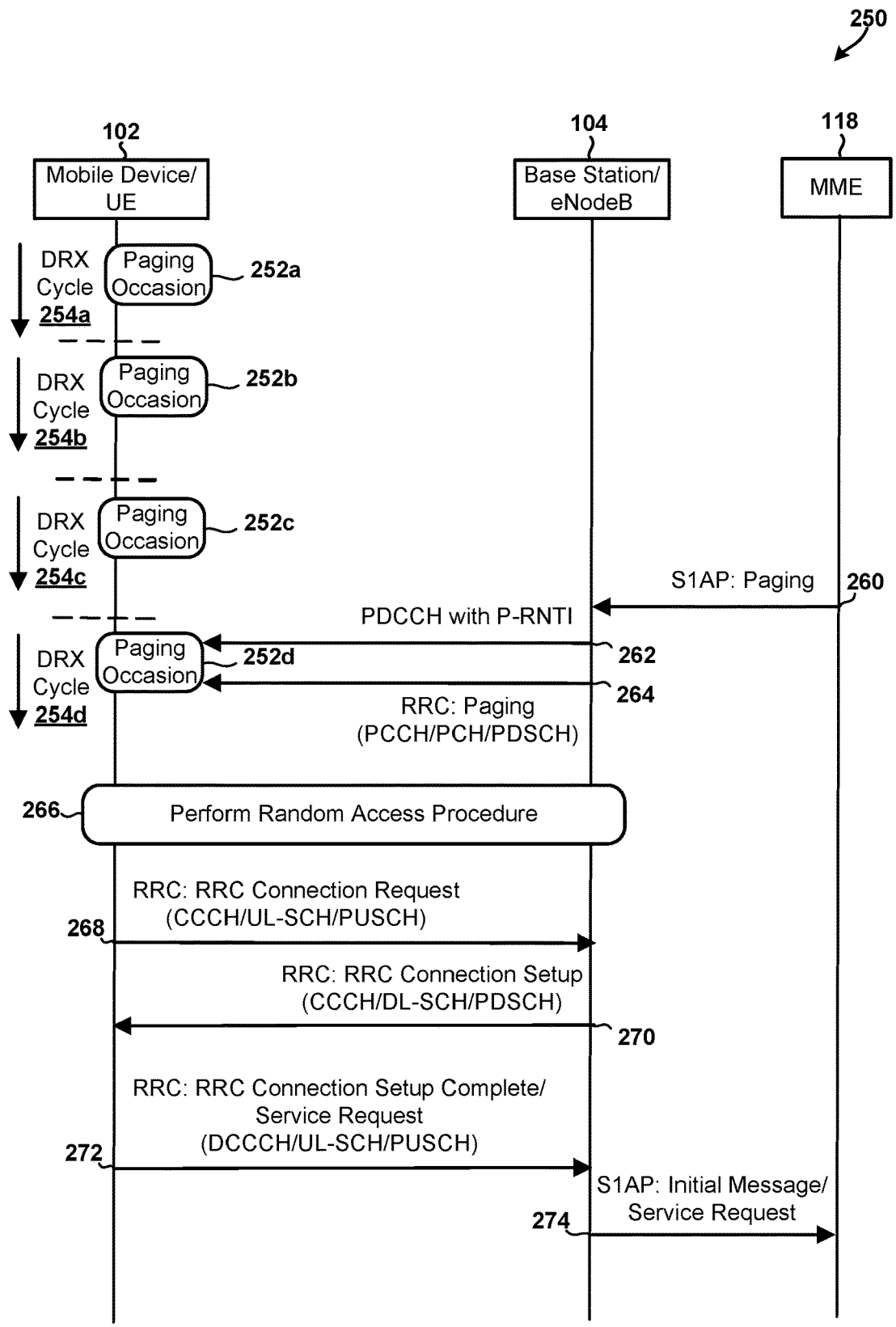
FIG. 2B is a call flow diagram illustrating a method of establishing a connection in response to receiving a page message during a paging occasion.

In operation block 208, the wireless device may receive system configuration information in system information blocks (SIBs). The system configuration information included in the SIBs may include a default discontinuous reception (DRX) cycle value (T) and an nB value. The nB value may be a multiple of DRX cycle value (e.g., 4T, 2T, T, T/2, T/4, T/8, T/16, T/32, etc.). The DRX cycle value and nB value may be included in the second SIB (i.e., SIB 2). The DRX cycle value may be defined as 32, 64, 128 or 256 radio frames. FIG. 2D illustrates each radio frame 275 may include ten (10) subframes 277 that are each one (1) millisecond in duration. Thus, each radio frame 275 may correspond to a duration of 10 milliseconds so that a DRX cycle defined as 128 radio frames may correspond to a duration of 1.28 seconds.

The wireless device may also request a DRX cycle. The actual DRX cycle used may be determined as the smaller of wireless device's requested DRX cycle or the default value associated via the SIB discussed above. As such, an attacker may accurately compute the paging occasion only with access to final information available in the ATTACH_REQUEST that the wireless device sends to the base station. That is, observing only the SIBs will not allow the attacker to launch a precise attack because the attacker cannot accurately account for situations in which the DRX cycle/paging occasion is set based on the wireless device's requested DRX cycle. Further, since it is challenging for an attacker to passively sniff the ATTACH REQUEST, it is much more likely that the attacker will launch a page hijack attack that employs sending IMSI paging in all possible paging occasions as opposed to attempting to compute the precise paging occasion of the wireless device and only sending IMSI paging in that computed paging occasion.

Returning to FIG. 2A, in operation block 210, the wireless device may perform a random access procedure to establish communication links to the network. For example, the wireless device may use a non-access stratum (NAS) attach process to establish an end-to-end bearer or communication link that may be used by the wireless device to send and receive data and user traffic to and from the base station (e.g., base station 104 illustrated in FIG. 1).

In determination block 212, the wireless device may determine whether the connection was successfully established. In response to determining that the connection was not successfully established (i.e., determination block 212="No"), the wireless device may re-initiate the random access procedure in operation block 210.

In response to determining that the connection was successfully established (i.e., determination block 212="Yes"), the wireless device may enter a connected state (e.g., ECM-connected, RRC-connected, etc.) and begin sending and receiving data and user traffic via the communication links to the base station in block 214.

After establishing the connection, the wireless device may enter a sleep mode or idle state (e.g., ECM-Idle, RRC Idle mode, etc.). That is, if there are no activities or processes running on the wireless device that need cellular connectivity, the wireless device modem can enter the Idle state (e.g., no phone call, no data access occurring). The wireless device modem enters into the Idle state from connected state because it helps save power when no active communication is needed by the wireless device.

While in the idle state, the wireless device may reduce power consumption by implementing or using the discontinuous reception (DRX) and paging techniques discussed in this application. For example, if the DRX cycle was defined as 128 radio frames in operation block 208, the wireless device may activate its receiver circuitry once every 1.28 seconds to monitor a shared paging channel for a fixed duration (e.g., one radio subframe or one millisecond).

Figure 2C:
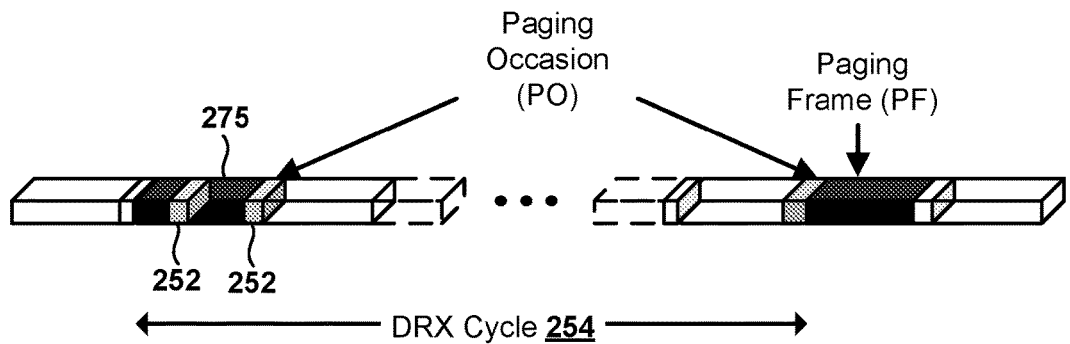
FIG. 2C is a block diagram illustrating the relationships between a paging frame, a paging occasion, and a discontinuous reception (DRX) cycle.
Figure 2D:
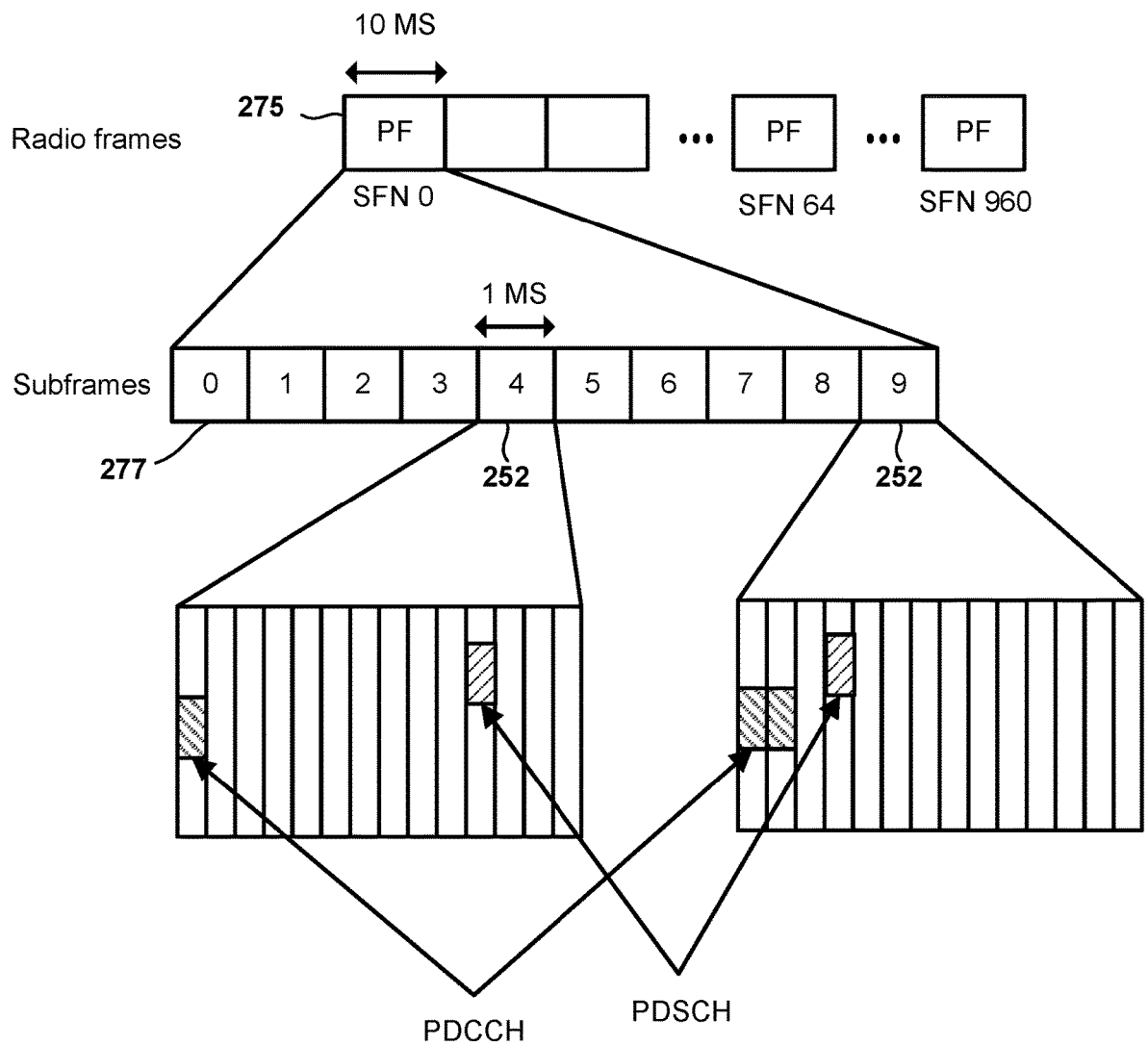
FIG. 2D is a block diagram illustrating the relationships between radio frames, paging frames, subframes, a physical downlink control channel (PDCCH), and a physical downlink shared channel (PDSCH).

With reference to FIGS. 2C and 2D, a paging frame is the radio frame 275 in which the wireless device wakes up. The wireless device may identify the paging frame (PF) within the DRX cycle 254a-254d, as shown in FIG. B, based on a paging frame index, which may be computed based on a combination of the DRX cycle value (T), the nB value, and the IMSI value stored in memory (e.g., SIM). For example, the wireless device may determine the paging frame index using the formula PF index=(T/N)*((IMSI mod 1024) mod N), where N=Min(T, nB). In the example illustrated in FIG. 2D, the system frame number (SFN) 0, SFN 64, and SFN 960 include paging frames.

The wireless device does not remain awake for all ten subframes 277 of the paging frame. Rather, it wakes up in a specific subframe (e.g., subframe 0, 4, 5, 9, etc.) or time period corresponding to the a specific subframe called a paging occasion (PO). In the example illustrated in FIG. 2D, subframes 4 and 9 are paging occasions (POs) 252. The wireless device 102 wakes up during each paging occasion 252, determines that there is a P-RNTI within the PDCCH transmission, and proceeds to decode the PDSCH information.

The wireless device may identify the paging occasion based on information stored in a look up table. For example, the wireless device may identify the paging occasion as the intersection of i_s and Ns values in the look-up table, where Ns=Max (1, nB/T) and i_s=Floor(UE_ID/N) mod Ns. If there is no paging information addressed to the wireless device available on the shared paging channel during the paging occasion, the wireless device may remain in the idle state to reduce power consumption and thus conserve its limited battery resources.

The wireless device may determine whether a paging occasion exists. For example, the wireless device may determine whether current time corresponds to a paging occasion and/or determine whether it received an interrupt or notification indicating that a paging occasion exists. Until the wireless device determines that a paging occasion exists, the wireless device may remain the sleep or idle state and continue monitoring for a paging occasion.

In response to determining that a paging occasion exists, the wireless device may wake or activate its receiver circuitry to listen for a paging message on a shared paging channel. The wireless device may determine whether there is a paging message that is addressed to the wireless device on the shared paging channel during the paging occasion. In response to determining that there is a paging message addressed to the wireless device on the shared paging channel during the paging occasion, the wireless device may perform a random access procedure to attach to the base station.

FIG. 2B illustrates the operations and interactions between a wireless device 102 (UE), base station 104 (eNodeB) and MME 118 in a system 250 that implements paging, and is suitable for use in implementing various embodiments. In the example illustrated in FIG. 2B, the wireless device 102 that has entered the idle mode. While operating in the idle mode, the wireless device 102 does not actively monitor the network for communications. Rather, the wireless device 102 activates its receiver circuitry on each paging occasion 252 within each DRX cycle 254a-254d, as shown in FIG. 2B, to listen to a shared paging channel in order to determine whether it includes a paging message address to the wireless device 102. In the illustrated example in FIG. 2B, the wireless device does not receive a suitable paging message in the first three DRX cycles 254a, 254b, and 254c.

In operation 260 in FIG. 2B, the MME 118 sends an S application protocol (SlAP) paging message to the base station 104. That is, while the wireless device 102 operates idle mode (e.g., ECM-Idle, etc.), the wireless device's location is known to the MME 118 on a tracking area (TA) basis. As such, the MME 118 sends the S1 AP paging message to all base stations within a tracking area group in operation 260. The base station 104 illustrated in FIG. 2B is one of the base stations within that tracking area group.

In operation 262, the base station 104 generates and sends a physical downlink control channel (PDCCH) transmission/message that includes physical downlink shared channel (PDSCH) information and a paging radio network temporary identifier (P-RNTI) to the wireless device 102. The wireless device 102 wakes up during the paging occasion 252d, determines that there is a P-RNTI within the PDCCH transmission, and proceeds to decode the PDSCH information extracted from the PDCCH transmission.

In operation 264, the base station 104 generates and sends a radio resource control (RRC) paging message to all wireless devices within its tracking area, including the wireless device 102 illustrated in FIG. 2B. The RRC paging message may be sent using physical, transport, and logical channels. The physical channel may be the physical downlink shared channel (PDSCH). The transport channel may be the paging channel (PCH). The logical channel may be the paging control channel (PCCH). The RRC paging message may include a paging records that address the wireless device 102 via its system TMSI (S-TMSI) value. The RRC paging message may contain multiple paging records to page multiple additional mobiles devices.

As part of operation 264, the wireless device 102 receives and decodes the RRC paging message from PDSCH resource block to determine whether it includes a paging message that is address to the wireless device 102. The wireless device 102 may determine that a paging message address to the wireless device 102 based on whether a TMSI or IMSI value included in the paging message matches a corresponding value stored in memory (e.g., the SIM) of the wireless device 102. If the wireless device 102 determines that the paging message does not include a TMSI or IMSI value that matches a corresponding value stored in memory (e.g., SIM), the wireless device may return to performing paging occasion monitoring operations.

In the example illustrated in FIG. 2B, the wireless device determines that the paging message is addressed to it (e.g., does include a TMSI or IMSI value that matches a corresponding value stored in memory/SIM) in operation 264. In response, the wireless device 102 and base station 104 may perform a random access procedure to establish communication links in operation block 266. That is, as part of operations 262 through 266, the wireless device 102 may exit the idle mode and/or attach to the base station 104 to receive call, message, or service in response to determining that it received a paging message during the paging occasion 252d of the fourth DRX cycle 254d.

In operation 268, the wireless device 102 may generate and send an RRC connection request message to the base station 104.

In operation 270, the base station 104 may generate and send an RRC connection setup message to the wireless device 102.

In operation 272, the wireless device 102 may generate and send an RRC connection setup complete message and/or a service request message to the base station 104.

In operation 274, the base station 104 may generate and/or send an S1AP initial message and/or a service request message to the MME 118. After the operation 274, the wireless device 102 may receive call, message, or service from the network.

In various embodiments, operations of the wireless device may be modified to enable monitoring and analyses of paging occasions outside the normal paging window. In some embodiments, the wireless device may include a downlink manager (DLM) component or functionality executing in a processor that specifies the decode window (active/awake window) to modem firmware by specifying a START object and STOP object, which may be a combination of system frame number (SFN) and subframe number (similar to paging occasions). Based on that window, the modem firmware may awaken to decode and collect the sub-frame level paging messages information. The modem firmware may receive the RRC SIB2 information for SFN, which has information that helps the UE to compute the paging occasion. The UE may send the computed paging occasion value to the Base Station when the finalized paging occasion is set up.

For example, assume SFN=10 (it can be anything from 0 to 1024, and wraps around) and sub-frame=5. The SFN may be used to determine from when the wireless device will start observing (needed to be in synchronization) radio frames and/or subframes. The DLM components and functionality may trigger wakeup of modem firmware at 5−2=3 (start object, which is 2 subframes earlier so that modem is fully awake so as not to miss information in the intended PO). The DLM components or functionality may instruct the modem firmware to decode sub-frames until it encounters the STOP object, which could be defined by SFN=11 and subframe 2. As a result, the modem firmware will be awake for all the subframes between these two points (SFN 10, subframe 5 to SFN 11 subframe 2). This defines the first time awake duration once the wireless device initially connects to the base station. After the first time awake duration, the awake subframe window repeats every DRX cycle.

In various embodiments, the modem firmware may be configured to listen to all subframes until the STOP object is encounters, or listen to only the subframes that could be a possible paging occasion. Listening to only the subframes that could be a paging occasion may be more efficient and almost as effective as listening to all subframes. This is because an attacker is not likely to broadcast on all subframes given that a wireless device configured on a victim cell could only listen for the possible paging occasions.

The wireless device processor may also configure and change the STOP object, and configure the modem awake window to include a number of consecutive sub frames for few connective DRX cycles. After the analyses of various embodiments is complete, the wireless device processor may reset the STOP object to the original values to reduce the number of subframes in the window to the original settings.

Figure 3:
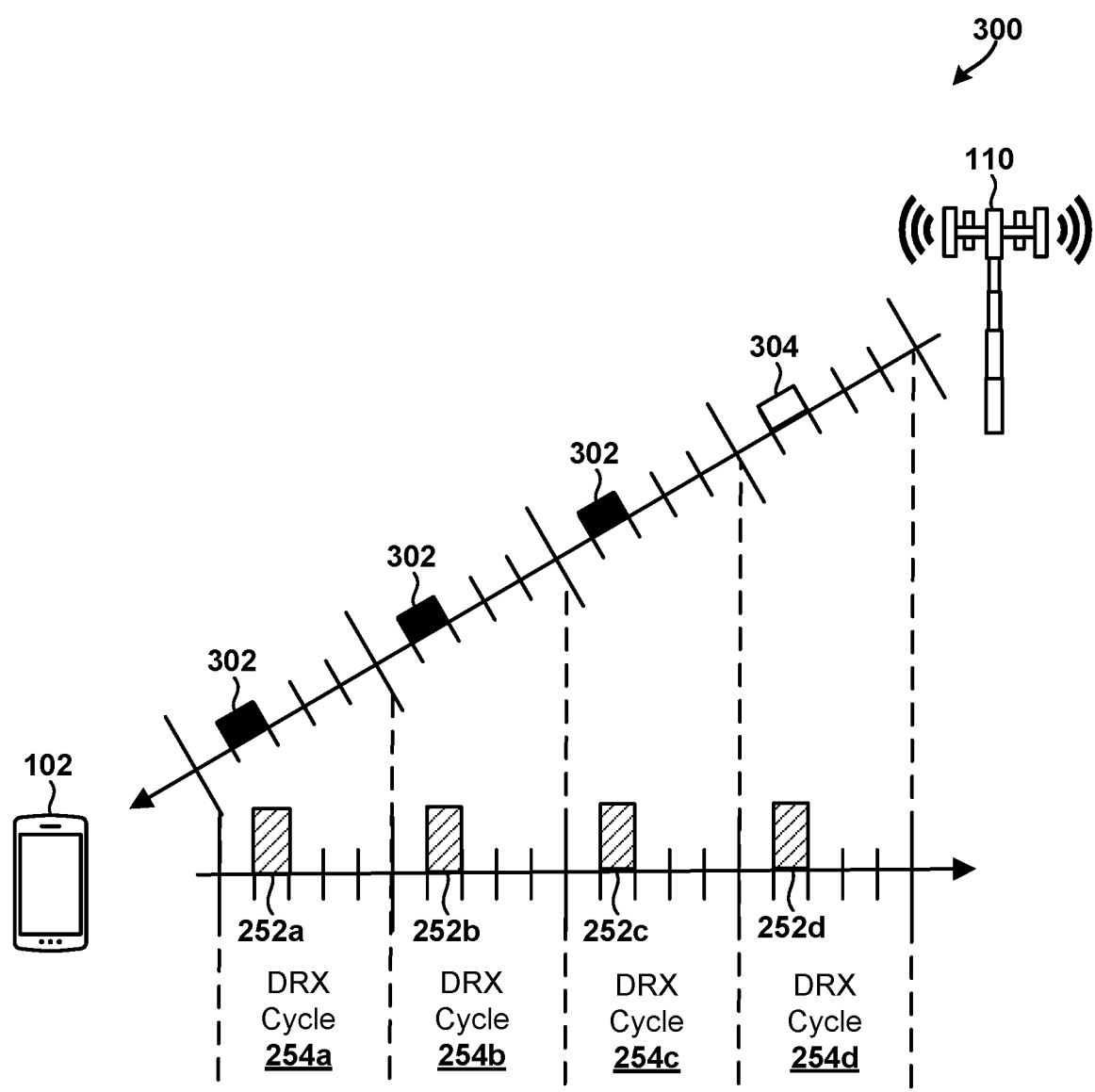
FIG. 3 is a communication system block diagram illustrating paging cycles from a base station received by a wireless device under normal circumstances.

FIG. 3 illustrates normal paging behavior of a base station. The system 300 illustrated in FIG. 3 includes a wireless device 102 that has entered the idle mode (e.g., as part of operation block 216 illustrated in FIG. 2). While operating in the idle mode, the wireless device 102 does not actively monitor the network for communications. Rather, the wireless device 102 activates its receiver circuitry on each paging occasion 252 to listen to a shared paging channel to determine whether it received a paging message that includes a UE's TMSI 302 or the wireless device's IMSI 304 value that matches the information stored in memory or the wireless device's SIM. The wireless device 102 may exit the idle mode and/or attach to the base station 104 to receive call, message, or service in response to determining that it received a paging message during the paging occasion 252, and the paging message includes a wireless device's TMSI 302 or IMSI 304 value that matches the information stored on the wireless device's SIM.

In the example illustrated in FIG. 3, the base station 104 broadcasts a paging message with UE's TMSI 302 value during a paging occasions 252a, 252b, 252c of the first three DRX cycles 254a, 254b, 254c. The TMSI 302 value is a temporary identifier and enhances security, unlike the IMSI 304 which is a permanent identifier, and reduces the possibilities that a nefarious actor or a rogue base station could use to track the user or launch an attack. However, as per the 3GPP protocol standard paging with IMSI is an option that is available since at times when the core cellular network is not aware of the TMSI 302 of a UE, it needs to page the UE with its IMSI 304. This available option of IMSI-based paging in the 3GPP standards may be exploited by malicious Base stations. In response to the TMSI base paging, the UE may exit the idle mode and/or attach to a base station 104 to receive a call, message, or service. The base station 104 broadcasts a paging message with the wireless device's IMSI 304 value during the paging occasion 252d of the fourth DRX cycle. In response to receiving the IMSI-based paging 304, the wireless device may exit the idle mode, discard any existing security context it may have, and/or then attach to a base station 104 to receive a call, message, or service. It should be understood that this example illustrates normal operations and the difference between TMSI based paging vs. IMSI-based paging. This illustration is a simplified view of the operations and doesn't highlight the radio frames. Rather, it shows the radio subframes from all the frames in a sequence of DRX cycles. In this paragraph wherever it is indicated "IMSI/TMSI based paging," the IMSI/TMSI implies the IMSI/TMSI value for the particular wireless device (or UE) that is receiving the paging message.

Figure 4:
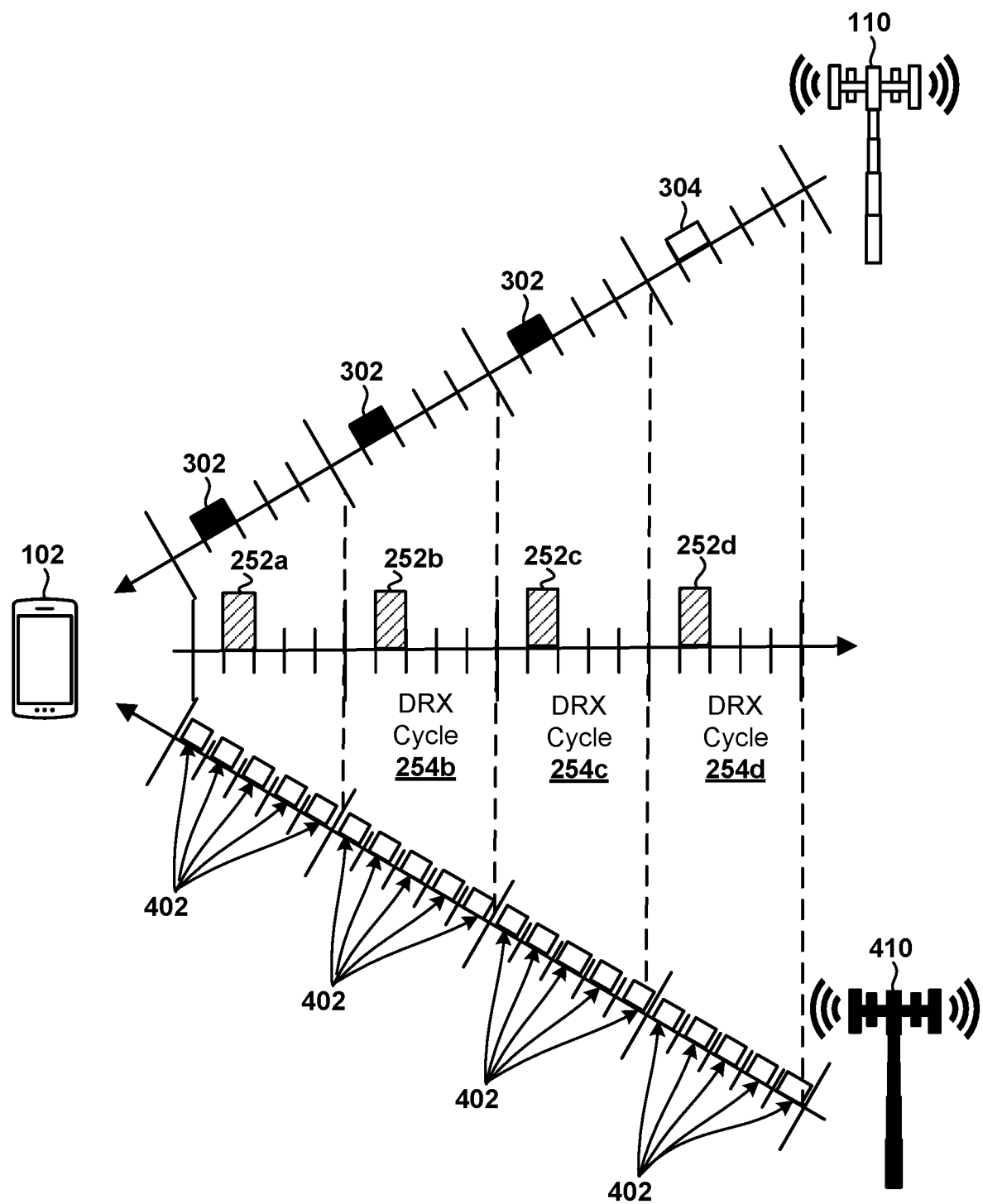
FIG. 4 is a communication system block diagram illustrating paging cycles from a base station and by a rogue cell received by a wireless device under a channel hijacking attack.

FIG. 4 illustrates paging messages that a wireless device may receive when a nefarious actor or a rogue base station 410 launches a paging channel hijacking attack, so as to track users, map communication networks, launch denial of service attacks, drain the battery and processing resources of wireless devices, and otherwise disrupt or hinder the services provided by communication networks and service providers. In particular, FIG. 4 illustrates that the nefarious actor or a rogue base station 410 operates in the same frequency band as the legitimate base station 104, and broadcasts fake or empty paging messages 402. By being located closer to the wireless device 102 (e.g., within the same building as the wireless device), the rogue base station 410 may appear to the wireless device to have a higher signal strength than the legitimate base station 104 in the shared paging channel (PDSCH). In some cases, the rogue base station 410 may transmit at a higher signal strength than the legitimate base station 104 in the shared paging channel (PDSCH). The rogue base station 410 attempts to match the DRX/paging cycles of the wireless device 102. The rogue base station 410 may also insert IMSI-based paging messages 402 in multiple or all radio subframes in multiple or all radio frames within the DRX cycles 254*b* through 254*d*. It should be understood that FIG. 4 presents a simplified view of the operation and doesn't highlight the radio frames, but directly shows all the radio subframes of all the frames in a sequence of DRX cycles.

As a result, the wireless device 102 may receive fake or empty IMSI-based paging messages 402 in multiple or all radio subframes, in multiple or all radio frames within the DRX cycles, and in one or more subsequent DRX cycles, and hence it observes the IMSI-based paging message to be present in its paging occasion or also in other subframes when the Modem FW is awake just before and after the paging occasion. If the IMSI value matches the information stored in memory, the wireless device 102 may initiate the random access procedure and attach to the rogue base station 410. The rogue base station 410 may then track the wireless device 102 or launch a denial of service attack by preventing the wireless device 102 from receiving legitimate paging messages from the base station 104. For remotely placed or hard to access IoT devices for which there is no manual access after initial installation, such denial of service attack, when repeated continuously, may be present an operational problem.

If the rogue base station 410 was able to acquire the wireless device's 102 IMSI (e.g., via an IMSI leak attack beforehand), the rogue base station may set the other fields of the paging record similar to an original paging message. Upon receiving the paging message with IMSI, the wireless device 102 may disconnect from the currently connected network and then send an ATTACH_REQUEST message to the rogue base station 410. This leads to service disruption, and may be used for tracking the user of the wireless device 102.

Further, since the wireless device 102 will receive its IMSI value in each paging occasion 252*a* through 252*d*, the wireless device will exit the idle state and preform the attach procedure many times. The attach procedure may require expensive cryptographic operations that drain the battery and command processing resources of wireless device 102. If the attacker knows the Globally Unique Temporary Identity (GUTI) of the wireless device, the rogue base station 410 may send a paging message with the GUTI to cause the wireless device 102 to respond with a cryptographically involved SERVICE_REQUEST message, which may further drain the battery and processing resources of wireless devices. This is particularly determinantal for IoT devices that require 10-yrs battery life (using LTE variants NB-IoT and LTE-M) from a single battery.

In addition, the rogue base station 410 may inject fake emergency paging messages and send them to a large number of wireless devices. These paging messages have empty records but with fake emergency warnings. To ensure a large reach, the rogue base station 410 may repeatedly broadcast in multiple or all radio subframes, in multiple or all radio frames within the DRX cycles, for one or more DRX cycles, while spoofing the system parameters of the legitimate base station 104. This can create artificial emergency situations and can cause public disorder.

For all these reasons, a nefarious actor or a rogue base station 410 utilize the paging features of existing communication networks to disrupt or hinder wireless devices from receiving the services provided by the communication network and/or service provider, thereby degrading the user experience. Further, in recent years, the cost and effort required to launch such attacks have reduced drastically with the availability of SDR and USRP boards that can be carried with the equipment (kept in a backpack, etc.). The availability of open source LTE/3G stacks (srsLTE, openLTE, OpenBTS-UMTS, etc.) allows a nefarious actor to implement the rogue base station 410 via a laptop computer. As a result, the prevalence or likelihood of such attacks is expected to increase.

Figure 5:
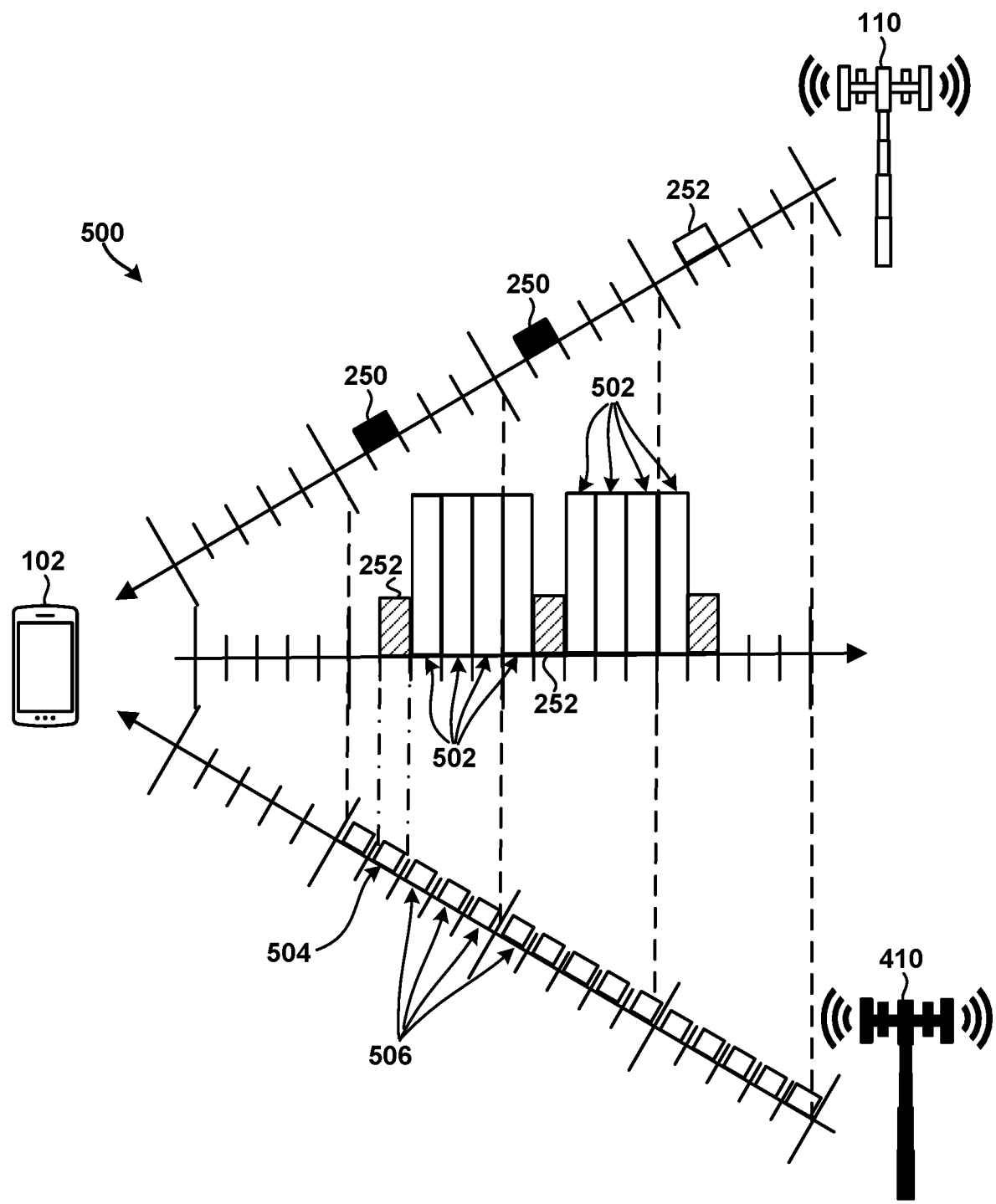
FIG. 5 is a communication system block diagram illustrating paging cycles from a base station and by a rogue cell received by a wireless device and signal analyses that the wireless device may perform to detect the paging channel hijacking attack in accordance with an embodiment.

FIG. 5 illustrates an embodiment for detecting an attack by a rogue base station 410 in which the wireless device 102 continues monitoring the paging channel in blocks 502 following legitimate paging occasions 252. If the wireless device 102 detects an IMSI-based paging message in blocks 502, the wireless device may determine that a rogue base station 410 is conducting a channel hijacking attack. It should be understood that this illustration is a simplistic view of the operation and doesn't highlight the radio frames, but directly shows the radio subframes from all the frames in a sequence of DRX cycles.

In some embodiments, the wireless device 102 may be configured so that after detecting the first IMSI-based paging message 504, the wireless device listens to all paging slots (e.g., all sub-frames that can potentially be a paging occasion), for all subsequent radio frames in the DRX cycle and for a few subsequent DRX cycles to detect if there is continued IMSI-based paging. If the wireless device 102 detects additional IMSI-containing paging messages 506 that are outside of its paging occasion 252 in the current or subsequent DRX cycles, the wireless device 102 may classify the base station as a rogue or malicious base station, and perform various responsive or actuation operations. For example, the wireless device 102 may ignore messages from that base station, detach from the base station, notify the network of the presence or existence of a malicious base station, etc. If the wireless device 102 detects frequent IMSI-based paging in the sub-frames within the paging frame, and also detects IMSI-based paging in one or more of the radio sub-frames of the subsequent frames within the DRX cycle, for one or more DRX cycles, the wireless device 102 may determine that the base station could be a rogue or malicious base station. In some embodiments, the wireless device may assign a rogue probability to the base station that indicates the likelihood that the base station is malicious or rogue. The wireless device may perform responsive actions based on the rogue probability or likelihood that the base station is malicious or rogue.

In an aspect of various embodiments, the wireless device (UE) also keeps track of the frequency of the abnormal IMSI-based Paging (i.e., not in its paging occasion) and the Base Station from which it originates and uses the information to determine if the fake Base Station is actually misusing the monitoring mechanism described herein to trick the UE to stay awake continuously into monitoring mode outside the paging occasions. As a preventive measure against any such a malicious compromise of the solution described herein, the new monitoring mechanism is disabled for the suspect malicious Base Station after the detection of a few abnormal IMSI-based-paging coming from the particular suspect Base Station. The monitoring stays enabled for IMSI-based Paging coming from other Base Stations. The monitoring for the IMSI-based-paging for the earlier detected suspect Base Station can be enabled after a particular time out period, which can be configurable and is implementation dependent. This aspect serves to prevent an attacker from misusing the monitoring-based detection logic of various embodiments, which could otherwise turn embodiment security measures into an attack that keeps the UE continuously awake outside the paging occasions in order to deplete the battery.

The behavior of monitoring and then reaching the threshold, timeout, and again restarting the monitoring after the timeout repeats multiple times indicates that the fake base station is continuously trying to do a paging channel hijack. In this situation the timeout value is exponentially increased by the processor at each repeat of this cycle so that the fake base station is unable to compromise the detection mechanism. In this paragraph wherever it is indicated "IMSI-based paging," the IMSI implies the IMSI value for the particular wireless device (or UE) that is receiving the paging message.

In some embodiments, the wireless device 102 may be configured so that after it detects the first IMSI-based paging message 504, the wireless device compares the RRC connection setup parameters from the previous RRC connection setup to determine whether there are separate (and significantly different) uplink channels being setup for two base stations with the same Cell ID, same SIB1 and same SIB2 information (one is valid, the other is fake and is spoofing the valid base station).

Figure 6:
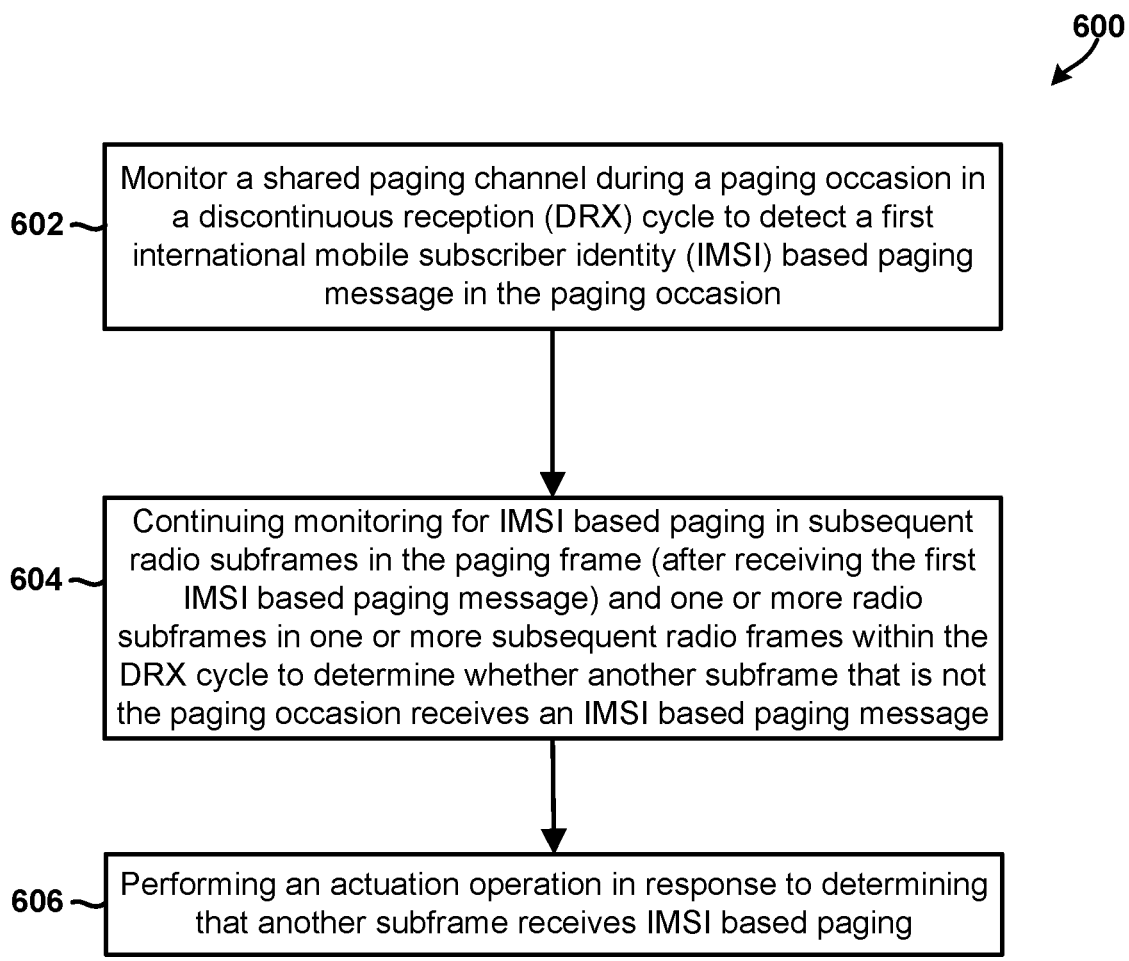
FIGS. 6 through 8 are process flow diagrams illustrating methods of detecting channel hijacking attacks on a shared paging channel in accordance with various embodiments.

FIG. 6 illustrates a method 600 of preventing paging channel hijacking attacks on shared paging channel that is used to cause wireless devices to initiate a procedure in accordance with some embodiments. Method 600 may be performed by a processor in a wireless device (e.g., wireless device 102 illustrated in FIG. 1).

In operation block 602, the processor may monitor a shared paging channel during a paging occasion in a discontinuous reception (DRX) cycle to detect a first IMSI-based paging message.

In operation 604, the processor may continue monitoring subsequent radio subframes within the first paging frame and subsequent radio frames within the DRX cycle, and repeat the monitoring on some or all of the subframes in some or all of the radio frames in subsequent DRX cycles, to detect another subframe that may receive IMSI-based paging. The continued monitoring of subsequent radio subframes within the first paging frame and subsequent radio frames within the DRX cycle, and continuing the monitoring for a subsequent DRX cycles, after detecting a subframe, which is different from the actual paging occasion, has received the IMSI-based paging allows the wireless device to intelligently determine and evaluate the probability that the base station is a rogue base station and/or whether it is experiencing a channel hijacking attack from a rogue base station.

As a preventive measure against any such malicious/nefarious compromise of the solution described herein, the new monitoring mechanism may be disabled for the suspect rogue base station after the detection of a few abnormal IMSI-based-paging messages coming from the particular suspect rogue base station.

The monitoring stays enabled for IMSI-based paging messages from other base stations. The monitoring for the IMSI-based-paging for the earlier detected suspect base station may be enabled after a particular time out period, which can be configurable and is implementation dependent. If the monitoring and then reaching the threshold, timeout, and again restarting the monitoring after the timeout repeats multiple times it indicates the fake base station continuously trying to do paging channel hijack. In this situation the timeout value is exponentially increased at each repeat of this cycle such that the fake base station is unable to compromise the detection mechanism itself. In this paragraph wherever it is indicated "IMSI-based paging," the IMSI implies the IMSI value for the particular wireless device (or UE) that is receiving the paging message.

In operation block 606, the processor may perform an actuation operation in response to determining that another subframe includes the IMSI value to counter a channel hijacking attack or otherwise defend against the rogue base station.

Figure 7:
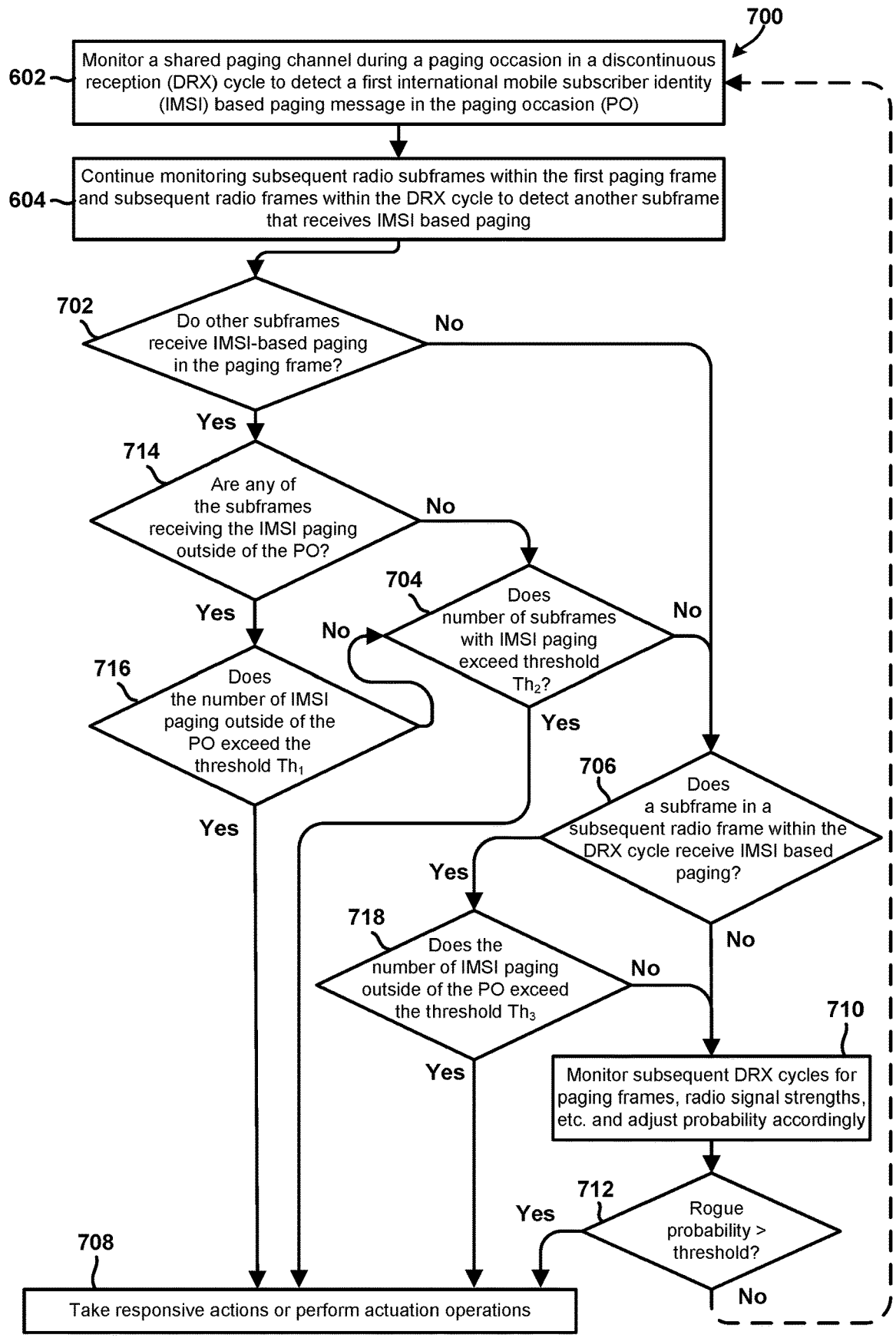

FIG. 7 illustrates a method 700 of preventing channel hijacking attacks on shared paging channel that is used to cause wireless devices to initiate a procedure in accordance with some embodiments. Method 700 may be performed by a processor in a wireless device (e.g., wireless device 102 illustrated in FIG. 1). In the following paragraphs wherever it is indicated "IMSI-based paging," the IMSI implies the IMSI value for the particular wireless device (or UE) that is receiving the paging message In operation blocks 602 and 604, the wireless device processor may perform the operations described above with reference to FIG. 6.

In determination block 702, the wireless device processor may determine whether other subframes receive IMSI-based paging in the paging frame.

In response to determining that there are other subframes that receive an IMSI-based paging message (i.e., determination block 702="Yes"), the wireless device processor may determine whether any IMSI-based paging received in a subframe is outside the paging occasion in determination block 714. Detecting even a single instance of IMSI-based paging in a subframe that is not in a paging occasion is a strong (or definitive) indication that a paging channel hijack is being attempted by the base station sending the IMSI-based paging. As such, in determination block 714, the wireless device processor may determine whether the subframes that received IMSI-based paging are not a paging occasion.

In response to determining that at least an IMSI-based paging received in a subframe is not a paging occasion (i.e., determination block 714="Yes"), the wireless device in determination block 716 determines if the total number of IMSI-paging that is received outside the paging occasions more than the threshold "Th$_1$" (i.e., determination block 716="Yes") and may increase the "rogue probability" above the threshold and take a responsive action in block 708. Determining in block 716 if the total number of IMSI-paging that is received outside the paging occasion so far is less than the threshold "Th$_1$" (i.e., determination block 716="No"), the mechanism goes to block 704 for further evaluation. The threshold 'Th1' is implementation specific, and an exemplary may consider Th$_1$=1, when a single appearance of IMSI-paging outside the paging occasion may increase the "rogue probability" above the threshold and take a responsive action in block 708. In response to determining that the none of the IMSI-based paging received in the subframes are outside a paging occasion (i.e., determination block 714="No"), i.e., subframe receiving the IMSI paging is the paging occasion the wireless device processor may determine whether the number of subframes that received IMSI-based paging messages exceeds a threshold value "Th$_2$" (e.g., 2, 4, etc.) and increase the rogue probability in determination block 704. The threshold "Th2"

is also implementation specific. The threshold "Th2" accounts for all IMSI paging messages received, whether they are within the paging occasion or outside the paging occasion. So, in general "Th2">"Th1". The threshold "Th2" can be adjusted automatically to be a higher value and the rate of increase of the rogue probability can be automatically adjusted to be a lower value when the UE determines that it is operating in an operator's network that can commonly use IMSI-based paging even for cases where TMSI based paging should be used.

In response to determining that there are no other subframes that receive an IMSI-based paging message (i.e., determination block 702="No") or that the number of subframes receiving IMSI-based paging messages do not exceed the threshold value "Th$_2$" (i.e., determination block 704="No"), the wireless device processor may determine whether subsequent radio frames within the DRX cycle need to be monitored to check for the reception of IMSI-based paging messages in determination block 706. If the number of subframes receiving IMSI-based paging messages is equal to or exceeds the threshold "Th$_2$", the wireless device may increase the "rogue probability" above the threshold and take a responsive action in block 708.

In response to determining that that any radio subframes in any of the subsequent radio frames within the DRX cycle receive an IMSI-based paging message (i.e., determination block 706="Yes"), the wireless device may perform threshold comparison in block 718 block (since this IMSI paging reception is not in the paging occasion in the paging frame and is the case of confirmed IMSI paging through paging channel hijack attack). Before taking responsive actions in block 708. The wireless device in determination block 718 determines if the total number of IMSI-paging that is received outside the paging occasions is more than the threshold "Th$_3$" (i.e., determination block 718="Yes") and may increase the "rogue probability" above the threshold and take a responsive action in block 708. Determining in block 716 if the total number of IMSI-paging that is received outside the paging occasion so far is less than the threshold "Th$_3$" (i.e., determination block 718="No"), the mechanism goes to block 710. An exemplary may consider Th$_3$=1, when a single appearance of IMSI-paging outside the paging occasion may increase the "rogue probability" above the threshold and take a responsive action in block 708. The wireless device may monitor all radio subframes for a few subsequent DRX cycles to perform additional analyses to assess whether the source of the paging messages is from a rogue base station and adjust a probability value (referred to herein as a "rogue probability,") or a threat score in operation block 710. Examples of such additional analyses that may be performed in operation block 710 include determining whether paging with IMSI is continuing, comparing RRC connection setup parameters from the previous RRC connection setup to determine whether there are separate (and significantly different) signaling radio bearers (SRBs) being setup for two base stations with the same Cell ID, same SIB1 and same SIB2 information, determine whether the sequence of pages is such that they do not cause the wireless device to increment its attach request counter and/or causing the wireless device to repeatedly wake upon paging, determine and compare the signal strength (e.g., receive (RX) Signal Level, etc.) of the base station to another seemingly similar base station, calculate an interference factor value, compare differences between the signal radio bearer (e.g., SRB1) of the base station and the signal radio bearer (e.g., SRB1) of another seemingly similar base station, compare various parameters of the base station (e.g., potential fake or malicious base station) and those of another seemingly similar base station (likely valid base station), identify inconsistencies or differences in channel setup parameters, and/or perform other similar operations to determine whether the base station is a rogue base station. Based on results of one or more of these example additional analyses, the wireless device processor may increase or decrease a rogue probability value (or a "threat score") consistent with the likelihood that the source of the paging message is a rogue base station based on the results of each additional analysis. The following paragraphs expand upon some of the additional analyses may be conducted in operation block 710 according to various embodiments.

In some embodiments, the wireless device processor may be configured to record events that indicate that the device was subject to an IMSI leak attack. Such attacks increase the possibility of the wireless device could be subject to the paging channel hijacking attack in the near future. That is, if the wireless device processor had encountered an IMSI leak earlier, then there is greater likelihood that a page with an IMSI value could be from a malicious actor or fake base station operator. The wireless device processor may adjust the weights or values used to update the rogue probability of the base station and/or adjust the level or severity of the responsive actions taken based on the recorded incidences of IMSI leak attacks.

In some embodiments, the wireless device processor may be configured so that, after it detects repeated IMSI/TMSI pages within a paging frame or DRX cycle, the wireless device processor determines whether the sequence of pages is such that pages do not cause the wireless device to increment its attach request counter and/or cause the wireless device processor to repeatedly wake upon paging. Based on these results, the wireless device may assign or update a rogue probability (or a "threat score") for the base station to indicate the likelihood that the base station is malicious or rogue.

In some embodiments, the wireless device processor may be configured to determine and compare the signal strength (e.g., RX Signal Level, etc.) of the base station to another seemingly similar base station. If there is a significant or unexpected difference in signal strengths, or if the signal strength of the base station is significantly higher than the seemingly similar base station, the wireless device processor may classify the base station as likely to be a rogue or malicious base station. This is because a malicious or rogue base station would use higher signal strengths (or be positioned closer to a target wireless device to appear to have a higher signal strength) to force camping on itself versus a valid base station. In some embodiments, the wireless device may update the rogue probability of the base station based on these results to indicate the likelihood that the base station is malicious or rogue.

In some embodiments, the wireless device processor may be configured to monitor the receive signal strength indicator (RSSI), Signal to Noise Ratio (SnR), Reference Signal Received Quality (RSRQ) and/or Reference Signal Received Power (RSRP) values and conditions, and calculate an interference factor value (e.g., a value between 0.0 and 1.0) based on the results of the monitoring. If the interference factor value exceeds a threshold value in the frames preceding an IMSI paging, the wireless device may update the rogue probability (or a "threat score") of the base station based on these results to indicate the likelihood that the base station is malicious or rogue.

In some embodiments, the wireless device processor may be configured to determine whether there is frequent paging with IMSI in the paging frame (e.g., within multiple subframes, etc.), and stay awake in consecutive non-paging occasions slots for some or all subsequent radio frames, for one or a few more consecutive DRX cycles to watch for IMSI paging. The wireless device may update the rogue probability (or the "threat score") of the base station based on these results to indicate the likelihood that the base station is malicious or rogue.

In some embodiments, the wireless device processor may be configured to compare various parameters of the base station (e.g., potential fake or malicious base station) and those of a another seemingly similar base station (likely valid base station). The parameters may include channel setup parameters, power control parameters, time alignment timer parameters, and scheduling request configuration parameters.

In some embodiments, the wireless device processor may be configured to identify inconsistencies or differences in channel setup parameters, such as differences in periodBSR timer and retxBSR-timer of the uplink shared channel (UL-SCH). As another example, the wireless device may compare differences between betaOffset-ACK-Index, betaOffset-RI-Index, and betaOffset-CQI-Index of the physical uplink shared channel (PUSCH). The index may be the offset of the subframe in which ACK/NACK, Rank Indicator, and channel quality indicator information is sent in the PUSCH. In addition, the wireless device may identify inconsistencies or differences in the channel quality indicator (CQI) report config parameters or physical uplink control channel (PUCCH) config parameters. The wireless device may update the rogue probability of the base station based on these results to indicate the likelihood that the base station is malicious or rogue.

In some embodiments, the wireless device processor may be configured to identify inconsistencies or differences in power control parameters, such as the transmit power control (TPC) parameter and the power headroom report config (PHR-config) parameter, which makes the mobile transmit with higher available power with 'prohibitPHR-timer' set to zero (0) indicating that it should 'never prohibit UE to send higher power.'

In some embodiments, the wireless device processor may be configured to identify inconsistencies or differences in time alignment timer parameters. The time alignment timer is the length of time wireless devices can shift alignment between received downlink subframe and sent uplink subframe as the signal distance gets further away. Setting this time to a large value to 'infinity' would be indicative of a fake or malicious base station. The wireless device may update the rogue probability (or "threat score") of the base station based on these results to indicate the likelihood that the base station is malicious or rogue.

The wireless device processor may also determine whether the 'channel config' and 'power config' parameters/timers are different in the two channels, which would indicate that one channel is to a fake base station that is spoofing the valid base station. Based on these results, the wireless device may assign or update a rogue probability of the base station to indicate the likelihood that the base station is malicious or rogue.

In some embodiments, the wireless device processor may be configured to identify inconsistencies or differences in scheduling request config parameters. For example, Sr-PUCCH-ResourceIndex indicates the wireless device with the frequency domain resources, whereas sr-ConfigIndex determines the time domain resources of PUCCH that carriers SR. The base station controls the maximum number SR transmissions from each wireless device on PUCCH using the parameter dsr-TransMax. Inconsistencies or differences in these parameters may be indicative of a fake or malicious base station. The wireless device may update the rogue probability of the base station based on these results to indicate the likelihood that the base station is malicious or rogue.

In determination block 712, the wireless device processor may determine whether the rogue probability (or threat score), as determined based on the continued monitoring performed in operation block 710, exceeds a threshold indicating that the source of the pages is most likely from a rogue base station.

In response to determining the number of subframes within paging frame exceed the threshold value "$Th_2$" (i.e., determination block 704="Yes"), that one or more radio subframes in the subsequent radio frames within the DRX cycle receive a number of IMSI-based paging messages that exceeds or is same as the threshold "$Th_3$" (i.e., determination block 718="Yes"), that the rogue probability exceeds the threshold (i.e., determination block 712="Yes"), or the reception of the number of IMSI-based paging messages in a subframe that is not a paging occasion exceeds or is same as the threshold "$Th_1$" (i.e., determination block 716="Yes"), the wireless device processor may take a responsive action or perform an actuation operation in operation block 708. The actions that may be taken in response to detecting a rogue base station or paging hijack attack, may include ignoring future messages from a base station that transmitted the first paging message, detaching from the base station, and/or generating and sending a notification message to a security server. The thresholds "$Th_1$" and "$Th_3$" are implementation specific, the minimum value of these threshold can be 1, when the responsive actions (in block 8) are triggered just after receiving one IMSI-based paging messages that is outside the paging occasion. Similarly, the threshold "$Th_2$" is also implementation specific. The threshold "$Th_2$" accounts for all IMSI paging messages received, whether they are within the paging occasion or not. So in general "$Th_2$">"$Th_1$,". The threshold "$Th_2$" can be adjusted automatically to be a higher value and the rate of increase of the rogue probability can be automatically adjusted to be a lower value when the UE determines that it is operating in a operator's network that can commonly use IMSI-based paging even for cases where TMSI based paging should be used.

In response to determining that the rogue probability does not exceed the threshold (i.e., determination block 712="No"), the wireless device processor may continue to perform the operations of the method 700 continuously or periodically to remain on guard for paging hijack attacks. The threshold is implementation specific and can be as low as receiving just one IMSI-based paging message outside the normal paging occasion.

Figure 8:
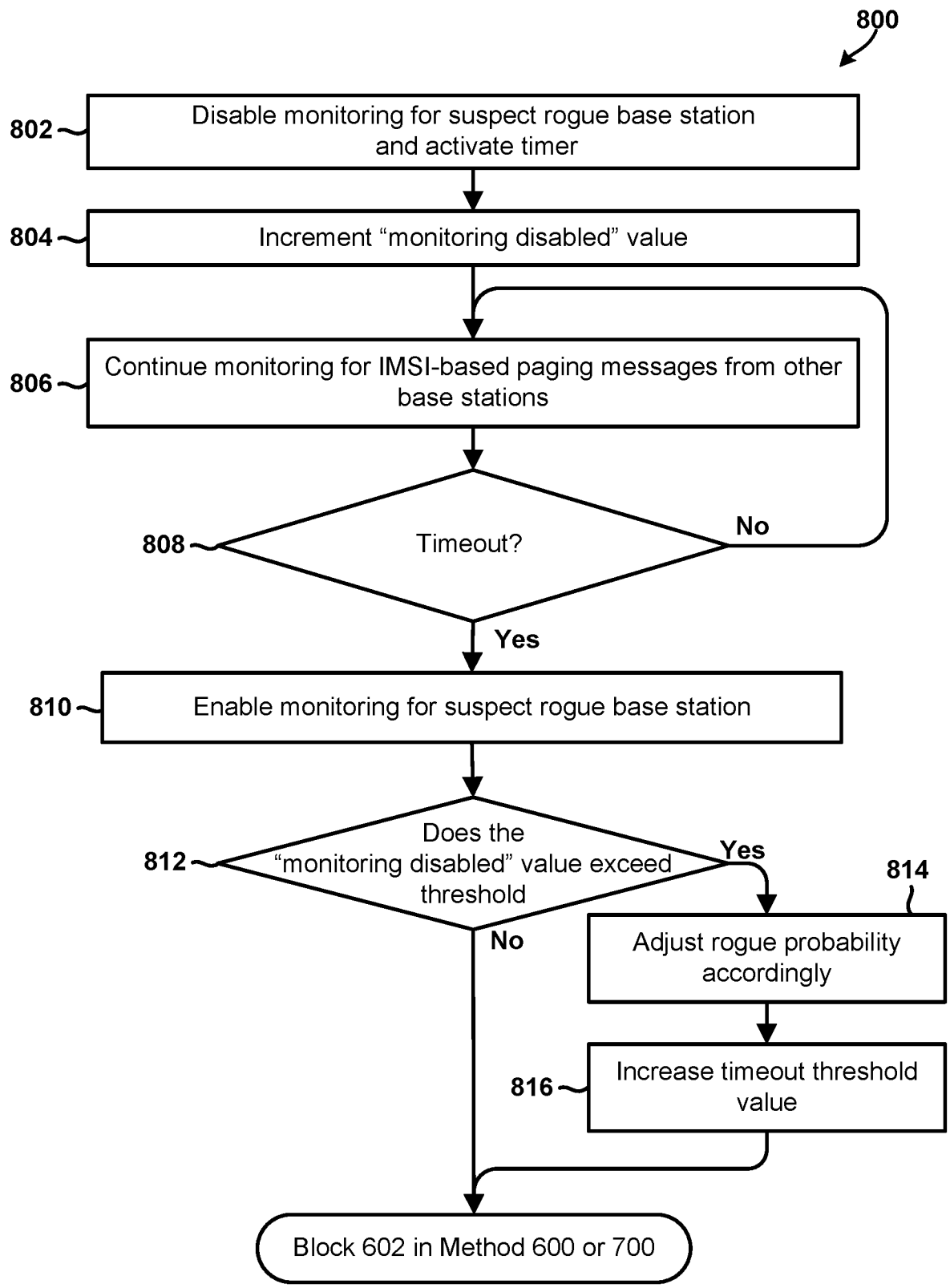

FIG. 8 illustrates a method 800 of responding to channel hijacking attacks on shared paging channel that is used to cause wireless devices to initiate a procedure in accordance with some embodiments. With reference to FIGS. 1-8, the method 800 may be performed by a processor in a wireless device (e.g., wireless device 102 illustrated in FIG. 1). All or portions of the method 800 may be performed prior to or as part of the operations in block 602 of the methods 600 or 700 described above with reference to FIGS. 6 and 7. Alternatively, the operations in blocks 802-816 of the method 800 may be performed in response to determining that the rogue probability does not exceed the threshold (i.e., determination block 712="No"), but prior to monitoring the shared paging channel in block 602 of the method 700 illustrated in FIG. 7. Method 800 may also be performed after the operations in block 606 of the method 600 illustrated in FIG. 6 or after the operations in block 708 of the method 700 illustrated in FIG. 7.

In block 802, the processor may disable monitoring for a suspect rogue base station and activate a timer. For example, the processor may disable monitoring of the base station for a period of time in block 802 in response to determining that an IMSI-based paging message is received in another subframe that is not the paging occasion. The processor may also disable monitoring of the base station in block 802 in response to detected abnormal IMSI-based-paging coming from that particular base station.

In block 804, the processor may increment a "monitoring disabled" value associated with the suspect rogue base station. The monitoring disabled value may identify the number of times that monitoring has been disabled for the base station. That is, the wireless device processor keeps track of the frequency of the abnormal IMSI-based paging (i.e., not in its paging occasion) and the base station from which it originates in block 804, which the processor may later use to determine whether a suspected rogue base station is misusing the monitoring mechanisms of various embodiments described herein to trick the wireless device to stay awake continuously in monitoring mode outside of the paging occasions.

In block 806, the processor may continue monitoring for IMSI-based paging messages from other base stations.

In determination block 808, the processor may determine whether a timeout condition occurred. For example, the processor may determine whether monitoring for a suspect rogue base station has been disabled for a configurable or predetermined amount of time or whether the value of the timer (activated in block 802) exceeds a time out threshold value. In response to determining that the timeout condition has not occurred (i.e., determination block 808="No"), the processor may continue monitoring for IMSI-based paging messages from other base stations in block 806. Furthermore, the wireless devices may be prevented from making any connection to the particular base station during the timeout when the monitoring for IMSI-based paging is disabled for the particular base station.

In response to determining that the timeout condition has occurred (i.e., determination block 808="Yes"), the processor may restart monitoring of the suspect rogue base station in block 810.

In determination block 812, the processor may determine whether the monitoring disabled value exceeds a threshold value. The threshold value may be a number of times monitoring has been disabled for a particular suspected rogue base station that is indicative of or consistent with the base station misusing the monitoring mechanisms of various embodiments described herein to trick the wireless device to stay awake continuously in monitoring mode outside of the paging occasions.

In response to determining that monitoring disabled value exceeds the threshold value (i.e., determination block 812="Yes"), the processor may adjust a rogue probability (or threat score) accordingly in block 814. In some embodiments, the processor may also determine whether the adjust rogue probability (or threat score) exceeds a threshold indicative of the source of the pages being a rogue base station as part of the operations in block 814. This determination may be similar to the determination made in determination block 712 in the method 700 described with reference to FIG. 7. In some embodiments, the processor may take responsive actions or perform actuation operations in block 708 of the method 700 if the rogue probability (or threat score) exceeds the threshold.

In block 816, the processor may increase the time threshold value or period of time that monitoring of the suspected rogue base station will be disabled in response to determining that the number of times that monitoring of the base station has been disabled exceeds the threshold value. That is, when the operations of disabling monitoring, waiting the timeout period, and restarting monitoring of the suspected rogue base station repeat multiple times, such behavior indicates that the base station is continuously trying to launch paging channel hijack attacks. To address this situation the processor may increase the timeout value exponentially in block 816 at each repeat of this cycle. Doing so will raise the timeout value to such extent that the rogue base station will be unable to compromise the detection mechanisms of various embodiments as another mechanism of attack. Furthermore, the wireless devices may be prevented from making any connection to the particular base station while the monitoring for IMSI-based paging is disabled due to disabled value exceeding the threshold value for the particular base station.

In response to determining that monitoring disabled value does not exceed the threshold value (i.e., determination block 812="No") or after performing the operations in blocks 814 and 816, the wireless device processor may perform the operations of the methods 600 or 700 as described above with reference to FIGS. 6 and 7.

Thus, the operations of the method 800 provide a way to prevent exploitation of the protections provided by the various embodiments (e.g., the methods 600 and 700) for use as another mechanism for attacking computing devices and user equipment.

Figure 9:
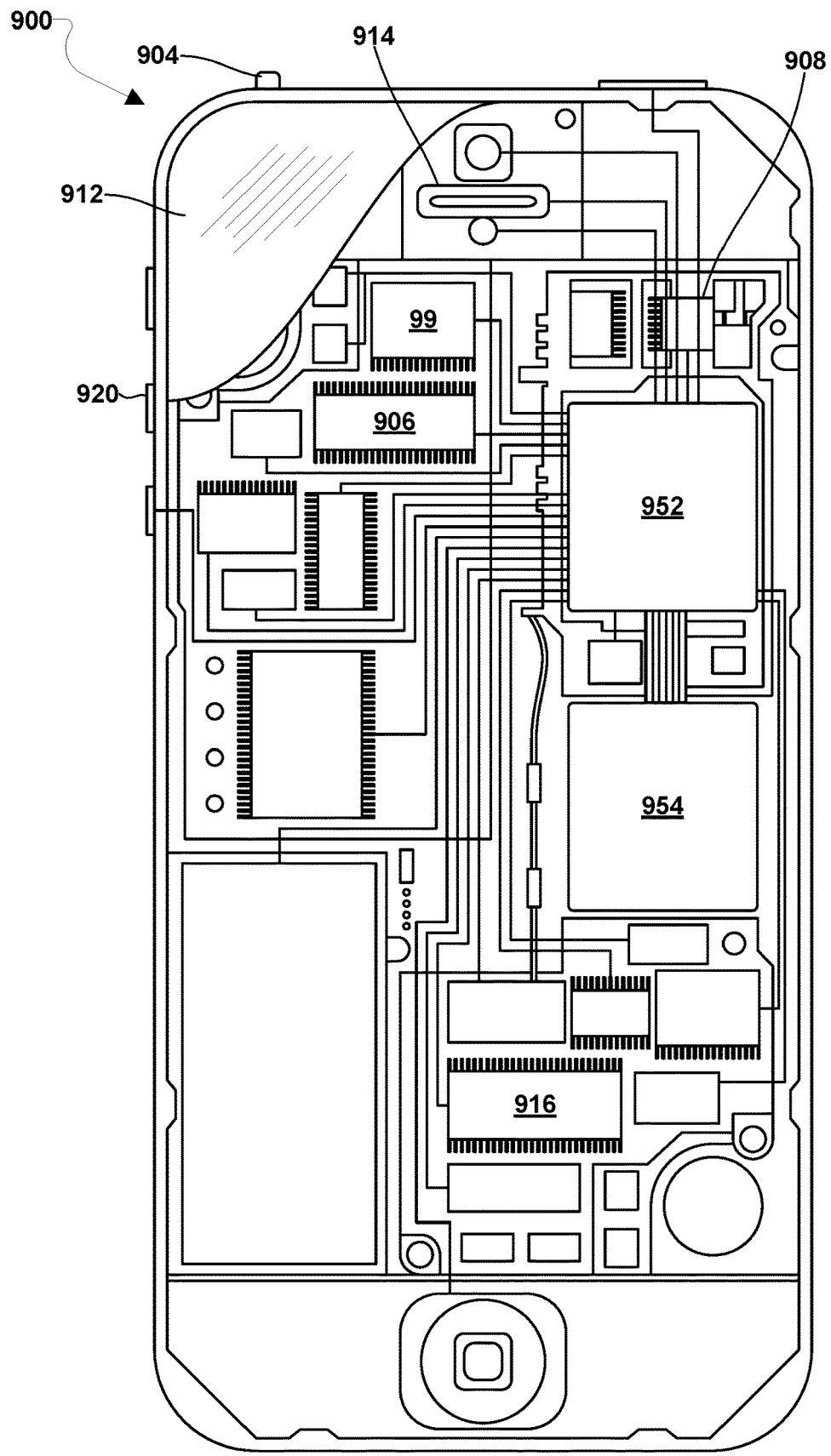
FIG. 9 is a component block diagram illustrating a wireless device suitable for implementing various embodiments.

The various embodiments may be implemented on a variety of computing system, an example of which is illustrated in FIG. 9 in the form of a smartphone. A smartphone 900 may include a first system on chip 952 (e.g., a SOC-CPU) coupled to a system on chip 954 (e.g., a 5G capable SOC). The first and second SOCs 952, 954 may include processors (e.g., application processor, modem processor, graphics processor, etc.), and may be coupled to internal memory 906, a display 912, and to a speaker 914. Additionally, the smartphone 900 may include an antenna 904 for sending and receiving electromagnetic radiation that may be connected to a wireless data link and/or cellular telephone transceiver 908 coupled to one or more processors in the first and/or second SOCs 952, 954. Smartphones 900 typically also include menu selection buttons or rocker switches 920 for receiving user inputs.

A typical smartphone 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 952, 954, transceiver 908 and CODEC circuit 910 may include a digital signal processor (DSP) circuit (not shown separately).

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks;

these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method of countering a shared paging channel hijack attack, comprising:
    monitoring, by a processor of a wireless device, a shared paging channel during a paging occasion (PO) in a discontinuous reception (DRX) cycle to detect a first international mobile subscriber identity (IMSI) based paging message in the PO, wherein:
        the DRX cycle identifies a number of radio frames and is broadcast within system information block 2 (SIB 2);
        the PO is one or more specific subframes within a paging frame; and
        the paging frame is a radio frame in which the wireless device wakes up to determine whether there is paging information present for the wireless device;
    continuing monitoring, by the processor, for IMSI-based paging in:
        subsequent radio subframes in the paging frame after receiving the first IMSI-based paging message,
        one or more radio subframes in one or more subsequent radio frames within the DRX cycle, and
        one or more subsequent DRX cycles;
    determining, based on the monitoring for IMSI-based paging in subsequent radio subframes in the paging frame after receiving the first IMSI-based paging message, one or more radio subframes in one or more subsequent radio frames within the DRX cycle, and one or more subsequent DRX cycles, whether one or more subframes that are not the PO receive an IMSI-based paging message;
    adjusting a rogue probability for a base station in response to determining that the one or more subframes that are not the PO receives the IMSI-based paging message; and
    performing an operation to protect against the shared paging channel hijack attack in response to detecting that the one or more subframes that are not the PO receives the IMSI-based paging message and in response to determining that the wireless device increments an attach request counter each time it detects that a subframe that is not the PO received the IMSI-based paging message.

2. The method of claim 1, further comprising determining, based on the monitoring, whether there are repeated IMSI-based paging messages.

3. The method of claim 2, further comprising determining whether another subframe that is not the PO receives the IMSI-based paging message.

4. The method of claim 1, further comprising determining whether the wireless device during monitoring increments the attach request counter each time it detects the IMSI-based paging message in a subframe that is not the PO.

5. The method of claim 1, wherein performing the operation to protect against the shared paging channel hijack attack comprises performing one of:
ignoring future paging messages from the base station that transmitted the one or more IMSI-based paging messages;
detaching from the base station that transmitted the one or more IMSI-based paging messages; or
generating and sending a notification message to a security server.

6. The method of claim 1, wherein adjusting the rogue probability for the base station comprises adjusting a probability value that indicates a likelihood that the base station that transmitted the one or more IMSI-based paging messages is not a legitimate base station authorized by a service provider network associated with the wireless device, the method further comprising:
determining whether the rogue probability exceeds a threshold; and
performing an operation to protect against a rogue base station in response to determining that the rogue probability exceeds the threshold.

7. The method of claim 1, further comprising:
performing monitoring, by the processor, of the subsequent radio subframes for additional indications of a rogue base station in response to determining that another subframe receives the IMSI-based paging message or that there are repeated IMSI-based paging messages; and
adjusting the rogue probability in response to detecting the additional indications of the rogue base station.

8. The method of claim 1, further comprising:
performing monitoring of subsequent radio subframes for additional indications of a rogue base station by comparing radio resource control (RRC) connection setup parameters from a previous RRC connection setup to determine whether signaling radio bearers (SRB) channels setup are different for a plurality of base stations with same cell ID parameter, same system information block 1 (SIB1) information and same system information block 2 (SIB2) information; and
adjusting a threat score for the base station that transmitted the one or more IMSI-based paging messages from among the plurality of base stations that broadcasted themselves with the same Cell ID, and substantially similar SIB1s, and substantially similar SIB2s.

9. The method of claim 1, further comprising:
detecting a current IMSI leak attack;
recording an event in memory that indicates that the wireless device was subject to the current IMSI leak attack;
recording information identifying the base station that triggered the current IMSI leak attack;
recording a location and time associated with the current IMSI leak attack;
comparing the information recorded for previous IMSI leak attacks with the current IMSI leak attack, and
adjusting the rogue probability based on the recorded information.

10. The method of claim 1, further comprising:
storing a record of signal strength values of one or more previous base stations that the wireless device camped and successfully connected to with security context set up;
determining a first signal strength value for the base station that transmitted the one or more IMSI-based paging messages;
identifying one or more previous base stations in the one or more previous base stations that the wireless device camped and successfully connected to with security context set up that have similar characteristics to the base station that transmitted the one or more IMSI-based paging messages;
determining whether a difference between the first signal strength value and a recorded signal strength value associated with at least one the identified previous base stations having matching characteristics exceed a threshold value; and
increasing the rogue probability in response to determining that the difference between the first signal strength value and the recorded signal strength value associated with the at least one the identified previous base stations having matching characteristics exceeds the threshold value.

11. The method of claim 1, further comprising:
determining whether 'channel config' and 'power config' parameters/timers are different in two channels; and
increasing the rogue probability in response to determining that the 'channel config' and 'power config' parameters/timers are different.

12. The method of claim 1, further comprising:
disabling monitoring of and preventing connection attempts to the base station that transmitted the one or more IMSI-based paging messages for a period of time in response to determining the one or more subframes that are not the PO receives the IMSI-based paging message or in response to determining that the rogue probability for the base station exceeds a threat threshold due to receiving repeated IMSI paging from the base station;
continuing to monitor other base stations for the one or more IMSI-based paging messages;
incrementing a monitoring disabled value that indicates a number of times that monitoring has been disabled for the base station;
exponentially incrementing the period of time for which the monitoring remains disabled for the base station by the wireless device in response to determining that the monitoring disabled value of the base station exceeds a threshold value; and
preventing any connection to the base station while the monitoring for IMSI-based paging is disabled due to the monitoring disabled value exceeding the threshold value for the base station.

13. The method of claim 1, further comprising:
determining whether a current network operator is commonly using the IMSI-based paging by keeping track of a usage of the IMSI-based paging on the PO for various base stations by the current network operator that the wireless device was connected to earlier;
determining whether there are IMSI-based paging messages outside of the PO in the one or more subsequent DRX cycles;
suspending monitoring in response to determining that there are no IMSI-based paging messages that are outside of the PO in the one or more subsequent DRX cycles for the base station operated by the current network operator determined to be commonly using the IMSI-based paging; and
reducing rate in which the rogue probability of threat is increased on each detection of IMSI-based paging in the PO.

14. A wireless device, comprising:
a wireless transceiver; and a processor coupled to the wireless transceiver and configured with processor-executable instructions to perform operations comprising:
  monitoring a shared paging channel during a paging occasion (PO) in a discontinuous reception (DRX) cycle to detect a first international mobile subscriber identity (IMSI) based paging message in the PO, wherein:
    the DRX cycle identifies a number of radio frames and is broadcast within system information block 2 (SIB 2);
    the PO is one or more specific subframes within a paging frame; and
    the paging frame is a radio frame in which the wireless device wakes up to determine whether there is paging information present for the wireless device;
  continuing monitoring for the IMSI-based paging in:
    subsequent radio subframes in the paging frame after receiving the first IMSI-based paging message,
    one or more radio subframes in one or more subsequent radio frames within the DRX cycle, and
    one or more subsequent DRX cycles;
  determining, based on the monitoring for IMSI-based paging in subsequent radio subframes in the paging frame after receiving the first IMSI-based paging message, one or more radio subframes in one or more subsequent radio frames within the DRX cycle, and one or more subsequent DRX cycles, whether one or more subframes that are not the PO receive an IMSI-based paging message;
  adjusting a rogue probability for a base station in response to determining that the one or more subframes that are not the PO receives the IMSI-based paging message; and
  performing an operation to protect against the shared paging channel hijack attack in response to detecting that the one or more subframes that are not the PO receives the IMSI-based paging message and in response to determining that the wireless device increments an attach request counter each time it detects that a subframe that is not the PO received the IMSI-based paging message.

15. The wireless device of claim 14, wherein the processor is configured with processor-executable instructions to perform operations further comprising determining, based on the monitoring, whether there are repeated IMSI-based paging messages.

16. The wireless device of claim 15, wherein the processor is configured with processor-executable instructions to perform operations further comprising determining whether one or more subframes that are not the PO receives the IMSI-based paging message.

17. The wireless device of claim 14, wherein the processor is configured with processor-executable instructions to perform operations further comprising determining whether the wireless device during monitoring increments the attach request counter each time it detects the IMSI-based paging message in a subframe that is not the PO.

18. The wireless device of claim 14, wherein the processor is configured with processor-executable instructions to perform operations such that performing the operation to protect against the shared paging channel hijack attack further comprises performing one of:
  ignoring future paging messages from the base station that transmitted the one or more IMSI-based paging messages;
  detaching from the base station that transmitted the one or more IMSI-based paging messages; or
  generating and sending a notification message to a security server.

19. The wireless device of claim 14, wherein:
  the processor is configured with processor-executable instructions to perform operations such that adjusting the rogue probability for the base station comprises adjusting a probability value that indicates a likelihood that the base station that transmitted the one or more IMSI-based paging messages is not a legitimate base station authorized by a service provider network associated with the wireless device; and
  wherein the processor is configured with processor-executable instructions to perform operations further comprising:
    determining whether the rogue probability exceeds a threshold; and
    performing an operation to protect against a rogue base station in response to determining that the rogue probability exceeds the threshold.

20. The wireless device of claim 14, wherein the processor is configured with processor-executable instructions to perform operations further comprising:
  performing monitoring, by the processor, of the subsequent radio subframes for additional indications of a rogue base station in response to determining that another subframe receives the IMSI-based paging message or that there are repeated IMSI-based paging messages; and
  adjusting the rogue probability in response to detecting the additional indications of the rogue base station.

21. The wireless device of claim 14, wherein the processor is configured with processor-executable instructions to perform operations further comprising:
  performing monitoring of subsequent radio subframes for additional indications of a rogue base station by comparing radio resource control (RRC) connection setup parameters from a previous RRC connection setup to determine whether signaling radio bearers (SRB) channels setup are different for a plurality of base stations with the same cell ID parameter, same system information block 1 (SIB1) information and same system information block 2 (SIB2) information; and
  adjusting a threat score for the base station that transmitted the first IMSI-based paging message from among the plurality of base stations that broadcasted themselves with same Cell ID, and substantially similar SIB1s, and substantially similar SIB2s.

22. The wireless device of claim 14, wherein the processor is configured with processor-executable instructions to perform operations further comprising:
  detecting a current IMSI leak attack;
  recording an event in memory that indicates that the wireless device was subject to the current IMSI leak attack;
  recording information identifying the base station that triggered the current IMSI leak attack;
  recording a location and time associated with the current IMSI leak attack;
  comparing the information recorded for previous IMSI leak attacks with the current IMSI leak attack, and
  adjusting the rogue probability based on the recorded information.

23. The wireless device of claim 14, wherein the processor is configured with processor-executable instructions to perform operations further comprising:

storing a record of signal strength values of one or more previous base stations that the wireless device camped and successfully connected to with security context set up;
determining a first signal strength value for the base station that transmitted the one or more IMSI-based paging messages;
identifying one or more previous base stations in the one or more previous base stations that the wireless device camped and successfully connected to with security context set up that have similar characteristics to the base station that transmitted the one or more IMSI-based paging messages;
determining whether a difference between the first signal strength value and a recorded signal strength value associated with at least one the identified previous base stations having matching characteristics exceed a threshold value; and
increasing the rogue probability in response to determining that the difference between the first signal strength value and the recorded signal strength value associated with the at least one the identified previous base stations having matching characteristics exceeds the threshold value.

24. The wireless device of claim 14, wherein the processor is configured with processor-executable instructions to perform operations further comprising:
determining whether 'channel config' and 'power config' parameters/timers are different in two channels; and
increasing the rogue probability in response to determining that the 'channel config' and 'power config' parameters/timers are different.

25. The wireless device of claim 14, wherein the processor is configured with processor-executable instructions to perform operations further comprising:
disabling monitoring of and preventing connection attempts to a base station that transmitted the one or more IMSI-based paging messages for a period of time in response to determining the one or more subframes that are not the PO receives the one or more IMSI-based paging messages or in response to determining that the rogue probability for the base station exceeds a threat threshold due to receiving repeated IMSI paging from the base station in any subframes that can also include the subframe that is the PO;
continuing to monitor other base stations for IMSI-based paging messages;
incrementing a monitoring disabled value that indicates a number of times that monitoring has been disabled for the base station;
exponentially incrementing the period of time for which the monitoring remains disabled for the base station by the wireless device in response to determining that the monitoring disabled value of the base station exceeds a threshold value; and
preventing any connection to the base station while the monitoring for IMSI-based paging is disabled due to the monitoring disabled value exceeding the threshold value for the base station.

26. The wireless device of claim 14, wherein the processor is configured with processor-executable instructions to perform operations further comprising:
determining whether the current network operator is commonly using the IMSI-based paging by keeping track of usage of the IMSI-based paging on the POs for various base stations by the current network operator that the wireless device was connected to earlier;
determining whether there are the IMSI-based paging messages outside of the PO in the one or more subsequent DRX cycles;
suspending monitoring in response to determining that there are no IMSI-based paging messages that are outside of the PO in the monitored subsequent DRX cycles for the base station operated by the current network operator determined to be commonly using the IMSI-based paging; and
reducing rate in which the rogue probability of threat is increased on each detection of IMSI paging in the PO.

27. A non-transitory computer readable storage medium having stored thereon processor-executable software instructions configured to cause a processor of a wireless device to perform operations for countering a shared paging channel hijack attack, the operations comprising:
monitoring a shared paging channel during a paging occasion (PO) in a discontinuous reception (DRX) cycle to detect a first international mobile subscriber identity (IMSI) based paging message in the PO, wherein:
the DRX cycle identifies a number of radio frames and is broadcast within system information block 2 (SIB 2); and
the PO is one or more specific subframes within a paging frame; and
the paging frame is a radio frame in which the wireless device wakes up to determine whether there is paging information present for the wireless device continuing monitoring for IMSI-based paging in:
subsequent radio subframes in the paging frame after receiving the first IMSI-based paging message,
in one or more radio subframes in one or more subsequent radio frames within the DRX cycle, and
in one or more subsequent DRX cycles;
determining, based on the monitoring for IMSI-based paging in subsequent radio subframes in the paging frame after receiving the first IMSI-based paging message, one or more radio subframes in one or more subsequent radio frames within the DRX cycle, and one or more subsequent DRX cycles, whether one or more subframes that are not the PO receive an IMSI-based paging message;
adjusting a rogue probability for a base station in response to determining that the one or more subframes that are not the PO receives the IMSI-based paging message; and
performing an operation to protect against the shared paging channel hijack attack in response to detecting that the one or more subframes that are not the PO receives the IMSI-based paging message and in response to determining that the wireless device increments an attach request counter each time it detects that a subframe that is not the PO received the IMSI-based paging message.

28. The non-transitory computer readable storage medium of claim 27, wherein the stored processor-executable software instructions are configured to cause the processor of the wireless device to perform operations further comprising determining, based on the monitoring, whether there are repeated IMSI-based paging messages.

29. The non-transitory computer readable storage medium of claim 27, wherein the stored processor-executable software instructions are configured to cause the processor of the wireless device to perform operations further comprising determining whether the wireless device during monitoring increments the attach request counter each time it detects the IMSI-based paging message in a subframe that is not the PO.

30. A wireless device, comprising:
means for monitoring a shared paging channel during a paging occasion (PO) in a discontinuous reception (DRX) cycle to detect a first international mobile subscriber identity (IMSI) based paging message in the PO, wherein:
the DRX cycle identifies a number of radio frames and is broadcast within system information block 2 (SIB 2);
the PO is one or more specific subframes within a paging frame; and
the paging frame is a radio frame in which the wireless device wakes up to determine whether there is paging information present for the wireless device;
means for monitoring for IMSI-based paging in:
subsequent radio subframes in a paging frame after receiving the first IMSI-based paging message,
one or more radio subframes in one or more subsequent radio frames within the DRX cycle, and
one or more subsequent DRX cycles;
means for determining, based on the monitoring for IMSI-based paging in subsequent radio subframes in the paging frame after receiving the first IMSI-based paging message, one or more radio subframes in one or more subsequent radio frames within the DRX cycle, and one or more subsequent DRX cycles, whether one or more subframes that are not the PO receive an IMSI-based paging message;
means for adjusting a rogue probability value for a base station in response to determining that the one or more subframes that are not the PO receives the IMSI-based paging message; and
means for performing an operation to protect against the shared paging channel hijack attack in response to detecting that the one or more subframes that are not the PO receives the IMSI-based paging message and in response to determining that the wireless device increments an attach request counter each time it detects that a subframe that is not the PO received the IMSI-based paging message.

* * * * *